(12) United States Patent
Taub et al.

(10) Patent No.: US 8,035,020 B2
(45) Date of Patent: Oct. 11, 2011

(54) COLLABORATIVE MUSIC CREATION

(75) Inventors: Robert D. Taub, Princeton, NJ (US); J. Alexander Cabanilla, New York, NY (US); George Tourtellot, Morganville, NJ (US)

(73) Assignee: MuseAmi, Inc., Princeton, NJ (US)

( * ) Notice: Subject to any disclaimer, the term of this patent is extended or adjusted under 35 U.S.C. 154(b) by 0 days.

(21) Appl. No.: 12/774,661

(22) Filed: May 5, 2010

(65) Prior Publication Data
US 2010/0212478 A1 Aug. 26, 2010

Related U.S. Application Data

(63) Continuation of application No. 12/031,510, filed on Feb. 14, 2008, now Pat. No. 7,714,222.

(60) Provisional application No. 61/028,490, filed on Feb. 13, 2008, provisional application No. 60/889,816, filed on Feb. 14, 2007, provisional application No. 60/889,821, filed on Feb. 14, 2007.

(51) Int. Cl.
*G10H 1/00* (2006.01)

(52) U.S. Cl. .................. 84/600; 84/609; 84/615; 84/601

(58) Field of Classification Search ............ 84/600–602, 84/609, 615, 608
See application file for complete search history.

(56) References Cited

U.S. PATENT DOCUMENTS

| | | | |
|---|---|---|---|
| 4,014,237 A | 3/1977 | Milde, Jr. | |
| 4,028,985 A | 6/1977 | Merritt | |
| 4,399,732 A | 8/1983 | Rothschild et al. | |
| 4,665,790 A | 5/1987 | Rothschild | |
| 4,895,060 A | 1/1990 | Matsumoto | |
| 4,926,737 A | 5/1990 | Minamitaka | |
| 4,945,804 A | 8/1990 | Farrand | |
| 4,960,031 A | 10/1990 | Farrand | |
| 4,999,773 A | 3/1991 | Clynes | |
| 5,018,427 A | 5/1991 | Uchiyama | |

(Continued)

FOREIGN PATENT DOCUMENTS

DE 10117870 A1 10/2002

(Continued)

OTHER PUBLICATIONS

"About *MyVirtualBand*" [Online] Jan. 2, 2007, MYVIRTUALBAND.COM, XP002483896; retrieved from the Internet on Jun. 11, 2008; URL: web.archive.org/web/20070102035042/ www.myvirtualband.com.

(Continued)

*Primary Examiner* — David S. Warren
(74) *Attorney, Agent, or Firm* — Kilpatrick Townsend & Stockton LLP

(57) ABSTRACT

Methods, systems, and devices are described for collaborative handling of music contributions over a network. Embodiments of the invention provide a portal, the portal being accessible over the network by a plurality of workstations and configured to provide a set of editing capabilities for editing music elements. Music contributions may be received at the portal. At least a portion of the music contributions include music elements. In certain embodiments, the music elements have been deconstructed from an audio signal or a score image. A number of collaboration requests may be received at the portal over the network. Some collaboration requests may originate from a first workstation, while other collaboration requests may originate from a second workstation. In response to at least one of the collaboration requests, at least a portion of the music elements may be edited using the editing capabilities of the portal.

41 Claims, 16 Drawing Sheets

U.S. PATENT DOCUMENTS

| | | | |
|---|---|---|---|
| 5,020,101 A * | 5/1991 | Brotz et al. | 379/388.02 |
| 5,038,658 A | 8/1991 | Tsuruta et al. | |
| 5,270,475 A | 12/1993 | Weiss et al. | |
| 5,292,125 A | 3/1994 | Hochstein et al. | |
| 5,325,423 A | 6/1994 | Lewis | |
| 5,367,117 A | 11/1994 | Kikuchi | |
| 5,488,196 A | 1/1996 | Zimmerman et al. | |
| 5,544,228 A | 8/1996 | Wagner et al. | |
| 5,646,361 A | 7/1997 | Morrow | |
| 5,685,775 A | 11/1997 | Bakoglu et al. | |
| 5,695,400 A | 12/1997 | Fennell et al. | |
| 5,704,007 A | 12/1997 | Cecys | |
| 5,728,960 A | 3/1998 | Sitrick | |
| 5,768,350 A | 6/1998 | Venkatakrishnan | |
| 5,792,971 A | 8/1998 | Timis et al. | |
| 5,806,039 A | 9/1998 | Fukada et al. | |
| 5,808,225 A | 9/1998 | Corwin et al. | |
| 5,820,384 A | 10/1998 | Tubman et al. | |
| 5,820,463 A | 10/1998 | O'Callaghan | |
| 5,824,937 A | 10/1998 | Szalay | |
| 5,825,905 A | 10/1998 | Kikuchi | |
| 5,864,631 A | 1/1999 | Shutoh | |
| 5,869,782 A | 2/1999 | Shishido et al. | |
| 5,886,274 A | 3/1999 | Jungleib | |
| 5,929,360 A | 7/1999 | Szalay | |
| 5,942,709 A | 8/1999 | Szalay | |
| 5,982,816 A | 11/1999 | Ogita et al. | |
| 5,983,280 A | 11/1999 | Hunt | |
| 6,067,566 A | 5/2000 | Moline | |
| 6,084,168 A | 7/2000 | Strick | |
| 6,121,530 A | 9/2000 | Sonoda | |
| 6,140,568 A | 10/2000 | Kohler | |
| 6,156,964 A | 12/2000 | Sahai et al. | |
| 6,175,872 B1 | 1/2001 | Neumann et al. | |
| 6,188,010 B1 | 2/2001 | Iwamura | |
| 6,201,176 B1 | 3/2001 | Yourlo | |
| 6,212,534 B1 | 4/2001 | Lo et al. | |
| 6,313,387 B1 | 11/2001 | Yamauchi | |
| 6,316,712 B1 | 11/2001 | Laroche | |
| 6,323,412 B1 | 11/2001 | Loo | |
| 6,353,174 B1 * | 3/2002 | Schmidt et al. | 84/609 |
| 6,417,884 B1 | 7/2002 | Chang et al. | |
| 6,423,893 B1 | 7/2002 | Sung et al. | |
| 6,482,087 B1 * | 11/2002 | Egozy et al. | 463/7 |
| 6,545,209 B1 | 4/2003 | Flannery et al. | |
| 6,598,074 B1 | 7/2003 | Moller et al. | |
| 6,653,545 B2 | 11/2003 | Redmann et al. | |
| 6,678,680 B1 | 1/2004 | Woo | |
| 6,703,549 B1 | 3/2004 | Nishimoto et al. | |
| 6,747,201 B2 | 6/2004 | Birmingham et al. | |
| 6,766,288 B1 | 7/2004 | Smith | |
| 6,798,886 B1 | 9/2004 | Smith et al. | |
| 7,050,462 B2 | 5/2006 | Tsunoda et al. | |
| 7,053,291 B1 | 5/2006 | Villa | |
| 7,074,999 B2 | 7/2006 | Sitrick et al. | |
| 7,098,392 B2 | 8/2006 | Sitrick et al. | |
| 7,227,072 B1 | 6/2007 | Weare | |
| 7,230,176 B2 | 6/2007 | Kosonen | |
| 7,254,644 B2 | 8/2007 | Norimatsu et al. | |
| 7,272,551 B2 | 9/2007 | Sorin | |
| 7,277,852 B2 | 10/2007 | Iyoku et al. | |
| 7,288,710 B2 | 10/2007 | Gayama | |
| 7,295,977 B2 | 11/2007 | Whitman et al. | |
| 7,297,858 B2 | 11/2007 | Paepcke | |
| 7,314,992 B2 | 1/2008 | Funaki et al. | |
| 7,323,629 B2 | 1/2008 | Somani et al. | |
| 7,342,167 B2 | 3/2008 | Cremer et al. | |
| 7,368,652 B2 | 5/2008 | Iketani et al. | |
| 7,371,954 B2 | 5/2008 | Masuda et al. | |
| 7,405,355 B2 | 7/2008 | Both et al. | |
| 7,423,213 B2 | 9/2008 | Sitrick | |
| 7,473,838 B2 | 1/2009 | Suzuki et al. | |
| 7,507,899 B2 | 3/2009 | Sumita | |
| 7,534,951 B2 | 5/2009 | Yamashita | |
| 7,544,881 B2 | 6/2009 | Makino et al. | |
| 7,547,840 B2 | 6/2009 | Noh et al. | |
| 7,579,546 B2 | 8/2009 | Sumita | |
| 7,582,824 B2 | 9/2009 | Sumita | |
| 7,589,271 B2 | 9/2009 | Jarrett et al. | |
| 7,615,702 B2 | 11/2009 | Becker et al. | |
| 7,645,929 B2 | 1/2010 | Chang et al. | |
| 7,649,136 B2 * | 1/2010 | Uehara | 84/610 |
| 7,674,970 B2 | 3/2010 | Ma et al. | |
| 7,732,703 B2 | 6/2010 | Lazovic | |
| 7,767,897 B2 | 8/2010 | Jochelson et al. | |
| 7,774,078 B2 * | 8/2010 | Booth et al. | 700/94 |
| 2001/0007960 A1 | 7/2001 | Yoshihara et al. | |
| 2001/0023633 A1 | 9/2001 | Matsumoto | |
| 2002/0007721 A1 | 1/2002 | Aoki | |
| 2002/0091847 A1 | 7/2002 | Curtin | |
| 2003/0089216 A1 | 5/2003 | Birmingham et al. | |
| 2003/0140769 A1 * | 7/2003 | Davis et al. | 84/609 |
| 2003/0164084 A1 | 9/2003 | Redmann et al. | |
| 2003/0188626 A1 | 10/2003 | Kriechbaum et al. | |
| 2004/0040433 A1 | 3/2004 | Errico | |
| 2005/0015258 A1 | 1/2005 | Somani | |
| 2005/0066797 A1 | 3/2005 | Miyamoto et al. | |
| 2005/0086052 A1 | 4/2005 | Shih | |
| 2005/0120865 A1 * | 6/2005 | Tada | 84/600 |
| 2005/0190199 A1 | 9/2005 | Brown et al. | |
| 2005/0234366 A1 | 10/2005 | Heinz et al. | |
| 2006/0050898 A1 | 3/2006 | Yamada et al. | |
| 2006/0065105 A1 | 3/2006 | Iketani et al. | |
| 2006/0065107 A1 | 3/2006 | Kosonen | |
| 2006/0075883 A1 | 4/2006 | Thorne et al. | |
| 2006/0086234 A1 | 4/2006 | Jarrett et al. | |
| 2006/0095254 A1 | 5/2006 | Walker et al. | |
| 2006/0112814 A1 * | 6/2006 | Paepcke | 84/645 |
| 2006/0150803 A1 | 7/2006 | Taub | |
| 2006/0150805 A1 | 7/2006 | Pang | |
| 2006/0219089 A1 | 10/2006 | Funaki et al. | |
| 2007/0012165 A1 | 1/2007 | Noh et al. | |
| 2007/0039449 A1 | 2/2007 | Redmann | |
| 2007/0044639 A1 | 3/2007 | Farbood et al. | |
| 2007/0076534 A1 | 4/2007 | Shih | |
| 2007/0076902 A1 | 4/2007 | Master | |
| 2007/0107584 A1 | 5/2007 | Kim et al. | |
| 2007/0131094 A1 | 6/2007 | Kemp | |
| 2007/0140510 A1 | 6/2007 | Redmann | |
| 2007/0163428 A1 * | 7/2007 | Salter | 84/611 |
| 2007/0193435 A1 * | 8/2007 | Hardesty et al. | 84/609 |
| 2007/0208990 A1 | 9/2007 | Kim et al. | |
| 2007/0214941 A1 | 9/2007 | Kourbatov | |
| 2007/0245881 A1 * | 10/2007 | Egozy et al. | 84/609 |
| 2007/0256551 A1 | 11/2007 | Knapp et al. | |
| 2008/0011149 A1 | 1/2008 | Eastwood et al. | |
| 2008/0060499 A1 | 3/2008 | Sitrick | |
| 2008/0113797 A1 * | 5/2008 | Egozy | 463/35 |
| 2008/0115656 A1 | 5/2008 | Sumita | |
| 2008/0156171 A1 | 7/2008 | Guldi | |
| 2008/0188967 A1 | 8/2008 | Taub et al. | |
| 2008/0190271 A1 | 8/2008 | Taub et al. | |
| 2008/0190272 A1 | 8/2008 | Taub et al. | |
| 2008/0210082 A1 | 9/2008 | Sumita | |
| 2008/0271592 A1 | 11/2008 | Beckford | |
| 2009/0171485 A1 | 7/2009 | Sim et al. | |
| 2009/0178544 A1 * | 7/2009 | Reynolds et al. | 84/610 |
| 2010/0043625 A1 * | 2/2010 | Van Geenen et al. | 84/600 |
| 2010/0132536 A1 * | 6/2010 | O'Dwyer | 84/609 |
| 2010/0216549 A1 * | 8/2010 | Salter | 463/31 |
| 2010/0307320 A1 * | 12/2010 | Hoeberechts et al. | 84/600 |

FOREIGN PATENT DOCUMENTS

| | | |
|---|---|---|
| DE | 102004033829 A1 | 2/2006 |
| DE | 102004033867 A1 | 2/2006 |
| EP | 1736961 A | 12/2006 |
| JP | 3249799 A | 11/1991 |
| JP | 05127668 A | 5/1993 |
| JP | 05143064 A | 6/1993 |
| JP | 06027940 A | 2/1994 |
| JP | 2003-187186 A | 7/2003 |
| WO | WO 03/005242 A1 | 1/2003 |
| WO | WO 2004/034375 A1 | 4/2004 |
| WO | WO 2004/057495 A1 | 7/2004 |
| WO | WO 2006/066075 A1 | 6/2006 |

OTHER PUBLICATIONS

"eJamming Features" [Online] Feb. 7, 2007; EJAMMING.COM, XP002483894, retrieved from the Internet: on Jun. 11, 2008; URL:web.archive.org/web/20070207122807/www.ejamming.com.

"*Ninjam—Realtime Music Collaboration Software*" [Online] Feb. 14, 2006; NINJAM.ORG, XP002483895, retrieved from the Internet on Jun. 11, 2008; URL:web.archive.org/web20060214020741/ninjam.org.

Beran et al., "Recognition of Printed Music Score", Lecture Notes in Computer Science, Jan. 1999, pp. 174-179.

Brossier, Paul M., et al. "Fast labeling of notes in music signals", ISMIR 2004, Oct. 14, 2004, Barcelona, Spain; Abstract, Sections 2 and 3.

Brossier, Paul M., et al. "Real-time temporal segmentation of note objects in music signals", ICMC 2004, Nov. 6, 2004, Miami, Florida; Abstract, Sections 2 and 3.

Ghias, Asif, et al. "Query by Humming", *Proceedings of ACM Mutlmedia '95 San Francisco*, Nov. 5-9, 1995, pp. 231-236; XP000599035.

Hori, T., et al. "Automatic Music Score Recognition/Play System Based on Decision Based Neural Network", *1999 IEEE Third Workshop on Multimedia Signal Processing* (Cat. No. 99TH8451:183-4.

International Search Report dated Aug. 8, 2008 from International Application No. PCT/US2008/054030, 3 pages.

International Search Report dated Feb. 17, 2009 from International Application No. PCT/US2008/052859, 5 pages.

International Search Report dated Jul. 31, 2009 from International Application No. PCT/US2009/034149, 3 pages.

International Search Report dated Jun. 24, 2008 from International Application No. PCT/US2008/054024, 3 pages.

International Search Report dated May 31, 2006 from International Application No. PCT/US2005/045580, 3 pages.

McNab, Rodger J., et al. "Signal Processing for Melody Transcription", *Proceedings of the 19$^{th}$ Australasian Computer Science Conference*, Melbourne, Australia, Jan. 31-Feb. 2, 1996, vol. 18(1)301-207.

Miyao, H. et al., "Head and Stem Extraction from Printed Music Scores Using a Neural Network Approach" in Proceedings of Third International Conference on Document Analysis and Recognition, IEEE Computer Society (1995) at 1074-1079.

Nagoshi, Yasuo, et al. "Transcription of Music Composed of Melody and Chord Using Tree-structured Filter Banks", *Proceedings of the IASTED International Conference Signal and Imaging Processing* Aug. 13-16, 2001 Honolulu, Hawaii, pp. 415-419.

Su, M., et al. "A Neural-Network-Based Approach to Optical Symbol Recognition", *Neural Processing Letters* (2002) 15:117-135.

Thalman, Florian, et al. "Jam Tomorrow: Collaborative Music Generation in Croquet Using OpenAI", *Proceedings of the Fourth International Conference on Creating, Connecting and Collaborating through Computing (C5'06)*, Jan. 1, 2006, pp. 73-78.

Velikic, Gordana, et al. "Musical Note Segmentation Employing Combined Time and Frequency Analyses", *Acoustics, Speech, and Signal Processing, 2004, Proceedings* (2004) vol. 4:277-280.

\* cited by examiner

COLLABORATIVE MUSIC CREATION

CROSS REFERENCES

This application is a continuation application of U.S. patent application Ser. No. 12/031,510 filed Feb. 14, 2008 entitled "COLLABORATIVE MUSIC SHARING", now U.S. Pat. No. 7,714,222 issued May 11, 2010. The application for the '222 patent claims the benefit of priority from U.S. Provisional Patent Application No. 60/889,816 filed Feb. 14, 2007 entitled "COLLABORATIVE MUSIC SHARING", and from U.S. Provisional Patent Application No. 60/889,821 filed Feb. 14, 2007 entitled "MUSIC-BASED SEARCH ENGINE", and from U.S. Provisional Patent Application No. 61/028,490 filed Feb. 13, 2008 entitled "MUSIC SCORE DECONSTRUCTION" to Robert D. Taub, et al., the disclosures of which are hereby incorporated by reference in this application, as if set forth in full in this document, for all purposes.

This application is further related to co-pending U.S. patent application Ser. No. 12/031,654, filed Feb. 14, 2008, entitled "MUSIC-BASED SEARCH ENGINE", which is hereby incorporated by reference, as if set forth in full in this document, for all purposes.

BACKGROUND

The present invention relates to audio applications in general and, in particular, to collaborative music creation.

It may be desirable to collaborate on creating and experiencing music for a number of reasons. One reason is that musicians have varying levels of skill in the many facets of music, including performance on different instruments, music reading, music theory, music composition, lyric composition, orchestration, and production. Another reason is that each musician may have particular influences, background, affinities, and other traits that affect artistic vision. Yet another reason is that musicians may want to work together from remote locations.

Even relatively advanced music collaboration environments are often limited in functionality, due to the fact that they lack the ability to process music contributions in many useful ways. For example, some existing environments allow contributors to upload audio files as tracks, which may be layered for playback. Some may even provide certain limited signal processing capabilities, like modifications in the amplitude of the signal (e.g., for fading) or the ability to cut, copy, or paste sections of the signal.

Certain types of music collaboration, however, may desire to deal with music contributions at a more elemental level (e.g., individual notes, keys, tempos, chord changes, motifs, patterns, timbre, etc.). For example, contributors may desire to change the instrumentation of a track, to transpose sections of a melody, to insert individual notes, to analyze chord progressions of certain contributions, to synchronize contributions from multiple contributors, and to have access to many other capabilities. Providing many of these capabilities may require that the music contributions are processed to extract certain types of elemental information from the audio signal.

For at least these reasons, it may be desirable to provide improved capabilities for music collaboration at the elemental level.

SUMMARY

Among other things, methods, systems, and devices are described for collaborative creation and handling of music contributions from multiple contributors.

Embodiments of the present invention facilitate collaborative handling of music contributions from multiple collaborators. In one aspect, techniques of the invention can be implemented as a network site, such as a Web portal. The Web portal can utilize audio signal processing, music character recognition technology, and music transcription techniques to provide a collaborative environment for music projects. Thus, embodiments of the invention can provide a network site for hosting multiple users in collaborative development efforts.

The portal can provide a variety of features and functionality. In certain embodiments, the portal may support audio editing functionality, including editing an audio file, initiating an audio file, sharing an audio file, publishing an audio file, initiating a print file, customizing an audio file (such as a ring tone), supporting a portal auction or marketplace for ring tones and audio files, and adding music and audio to video files. In other embodiments, the portal may support networking and collaboration functionality, including conferencing (e.g., by text, audio, or video), and restricting access (e.g., to certain areas of the portal, to certain files, or to certain functions). In still other embodiments, the portal may support production functionality, including generation of score and audio output of collaborative projects.

Other features and advantages of the present invention should be apparent from the following description of preferred embodiments that illustrate, by way of example, the principles of the invention.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Overview

Embodiments of the present invention facilitate collaborative handling of music contributions from multiple collaborators. In one aspect, techniques of the invention can be implemented as a network site, such as a Web portal. The Web portal can utilize audio signal processing, music character recognition technology, and music transcription techniques to provide a collaborative environment for music projects. Thus, embodiments of the invention provide a network site for hosting multiple users in collaborative development efforts.

The portal can provide a variety of features and functionality. In certain embodiments, the portal may support audio editing functionality, including editing an audio file, initiating an audio file, sharing an audio file, publishing an audio file, initiating a print file, custom-design of an audio file (such as a ring tone), supporting a portal auction or marketplace for ring tones and audio files, and adding music and audio to video files. In other embodiments, the portal may support networking and collaboration functionality, including conferencing (e.g., by text, audio, or video), and restricting access (e.g., to certain areas of the portal, to certain files, or to certain functions). In still other embodiments, the portal may support production functionality, including generation of score and audio output of collaborative projects.

Figure 1:
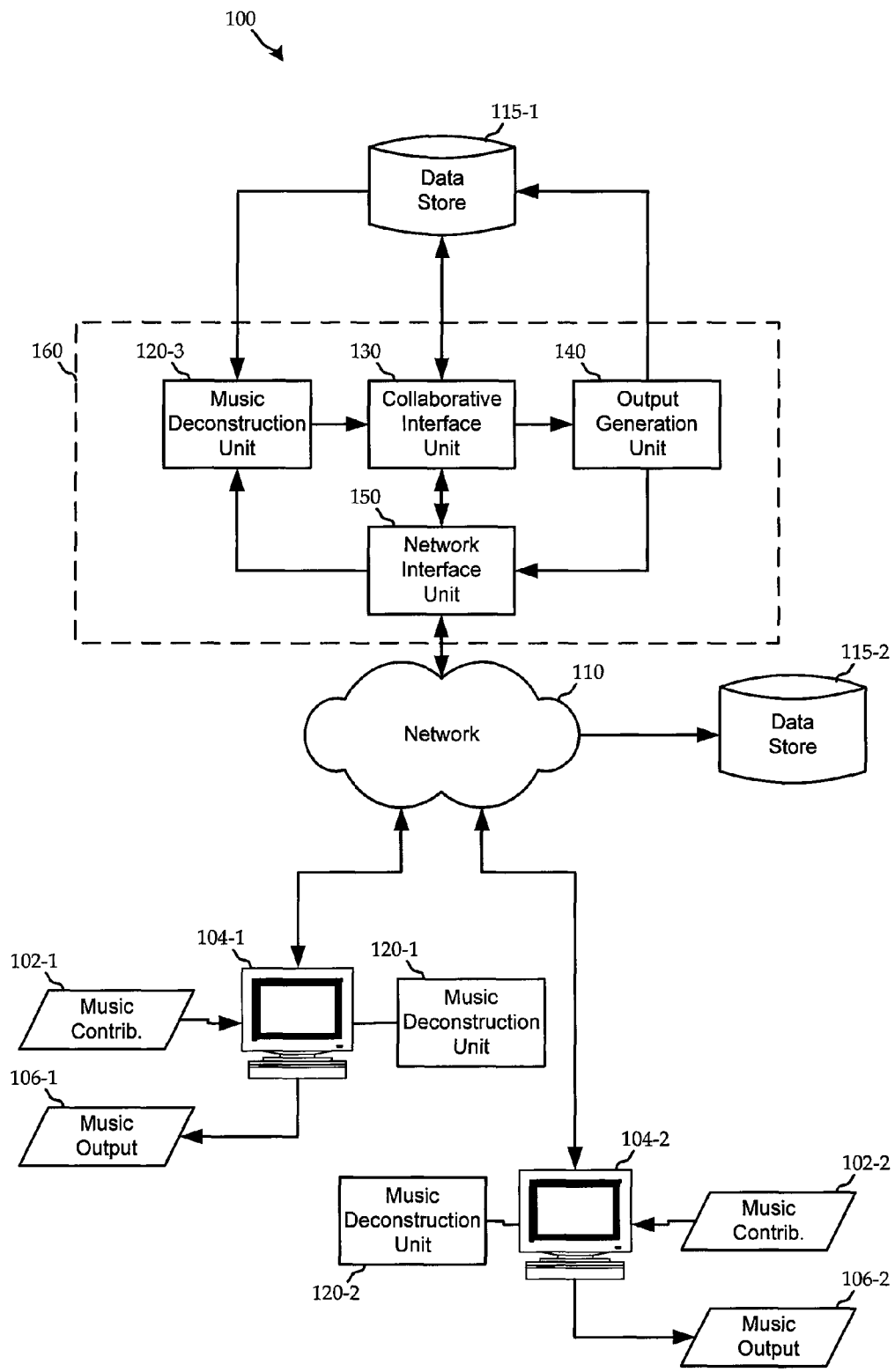
FIG. 1 shows a high-level simplified block diagram of a system constructed in accordance with the invention for collaborative handling of music contributions.

FIG. 1 shows a high-level simplified block diagram of a system 100 constructed in accordance with the invention for collaborative handling of music contributions. The system 100 includes a portal 160 connected to a number of workstations 104 via a network 110. The network 110 may be any facilitator of communication between the number of workstations 104. For example, the network 110 may be the Internet or a local area network (LAN).

The workstations 104 may be any devices or systems configured to communicate with the network 110 and to receive a music contribution 102. In some embodiments, the workstations 104 are multi-purpose devices. For example, the workstations 104 may be computers (e.g., laptops, desktops, etc.) or handheld devices (e.g., personal digital assistants, cellular telephones, etc.). In other embodiments, the workstations 104 are dedicated devices. For example, one of the workstations 104 may be a dedicated portable device developed specifically for providing a collaborative environment, including receiving a music contribution 102 and communicating with the network 110. In certain embodiments, the workstations 104 are network interfaces for a music contribution device. For example, one of the workstations 104 may be a direct network interface for an electric guitar or a digital audio component.

It will be appreciated that there are many ways for the workstations 104 to receive the music contribution 102 according to the invention. For example, the music contribution 102 may be received through an internal or external microphone, a line-level audio port, a file transfer (e.g., from a fixed or removable data store or over a network), a score image capture device, etc. Music input embodiments are discussed further below.

In some embodiments, the workstations 104 are configured to generate music output 106. In one embodiment, the music output 106 includes audio output, configured to be played through a speaker. In another embodiment, the music output 106 includes an audio file configured to be stored, played, and/or shared over a network. In yet another embodiment, the music output 106 includes music element data (e.g., pitches, intervals, tempos, keys, amplitudes, etc.) for use by other compatible systems. In still another embodiment, the music output 106 includes score representation data, configured to be used by score editing software, sent to a document editing or publishing system, or printed.

Depending on the type of music contribution 102 and how the collaborators wish to use the music contribution 102, it may be desirable to deconstruct music elements from the music contribution 102. In various embodiments, collaborators may wish to use some music contributions 102 in their non-deconstructed (e.g., signal-level) form, while they may wish to use other music contributions 102 in their deconstructed (e.g., score-level) form. For example, say a first music contribution 102 includes a recorded sample of a peculiar sound (e.g., hitting a high-tension cable with a hammer), and a second music contribution 102 includes a recorded performance of a drum beat. Collaborators may wish to deconstruct the drum beat to extract music element information relating to tempo and meter, and use the music elements to synchronize the peculiar sound sample to certain rhythmic locations (i.e., without extracting any music elements from the peculiar sound sample). Music deconstruction is described more fully below.

In some embodiments, the system 100 includes one or more music deconstruction units 120 for providing music deconstruction functionality. In certain embodiments, the music deconstruction units 120 are resident on the workstations 104. For example, the music deconstruction units 120 may be implemented as client-level software. In these embodiments, the music contribution 102 may be deconstructed into music elements before being sent over the network 110 to the portal 160. In other embodiments, a music deconstruction unit 120 may be provided as part of the portal 160 (e.g., element 120-3). The music contribution 102 may be received at a workstation 104, sent over the network 110 to the portal 160, and then deconstructed into music elements at the portal 160.

In certain embodiments, the portal 160 may be in operative communication with one or more data stores 115. In some embodiments, the portal 160 communicates with the data stores 115 over the network 110. In other embodiments, the portal 160 communicates with the data stores 115 directly. The data stores 115 may be configured to store one or more types of information relating to music contributions 102 or music output 106. For example, the data stores 115 may be configured to store raw audio files (e.g., files containing digitized audio signal data), encoded audio files (e.g., files containing metadata relating to the file content data or the audio signal data), music element information (e.g., deconstructed music elements stored in a multi-dimensional relational database, associated with their respective music contribution), edit data (e.g., logs or records of edits made to one or more music contributions, or certain pointer and time stamp data to efficiently record edits without saving multiple copies of a music contribution), etc.

It will be appreciated that certain types of data security may be desirable in embodiments of the invention. In some embodiments, the data stores 115 are configured to store data using certain types of data security (e.g., encryption, password protections, etc.). In other embodiments, the physical and virtual communication links between various components of the system 100 are secure (e.g., by secure socket layer encryption). For example, the network communications between the portal 160 and the workstations 104, or between the portal 160 and the data stores 115, may be secure. In still other embodiments, the music output 106 may be secured to prevent copying, deleting, etc. For example, certain digital rights management (DRM) techniques may be employed to restrict unauthorized copying or sharing of music output 106 files.

In some embodiments, the portal 160 communicates with the network 110 through a network interface unit 150. Certain embodiments of the network interface unit 150 facilitate communication between the portal 160 and the network 110 by providing certain types of network functionality. For example, the network interface unit 150 may route and/or interpret network traffic to allow for effective collaboration, file transfer, and other capabilities of the portal 160.

Various embodiments of the network interface unit 150 provide enhanced capabilities. In some embodiments, the network interface unit 150 is configured to receive and process login information from workstations 104 via the network 110. In one embodiment, the login information is used to verify a user of a workstation 104 to determine the user's access rights to the portal 160. The access rights may determine, for example, whether the user can enter the portal 160, which files the user may access, which functions of the portal 160 the user may use, etc.

It will be appreciated that many embodiments of the portal 160 are possible according to the invention. In some embodiments, the portal 160 is configured to be used through a Web browser, and is locatable at a network address. In certain of these embodiments, the portal 160 is configured to be extensible to many different browsing environments (e.g., by being written in XML, HTML, or another extensible markup language). In other embodiments, the portal 160 is implemented as a client-side application that resides on workstations 104. In these embodiments, certain functionality may be implemented on a server (e.g., file management), while much of the collaborative processing is done on client workstations 104. In yet another embodiment, the portal 160 may be resident on a separate network server for a local area network, or a workstation 104 may be used to serve the application to the network.

Embodiments of the portal 160 include a collaborative interface unit 130. In various embodiments, the collaborative interface unit 130 is configured to perform central functions of the portal 160, including collaboration functionality (e.g., virtual conferencing, change and file management, etc.), music viewing functionality (e.g., displaying score views, signal views, piano roll views, timbre graphs, note envelope graphs, histograms, etc.), and music editing functionality (e.g., synchronization, track editing, note editing, signal editing, instrumentation editing, etc.). Embodiments and functions of the collaborative interface unit 130 are described more fully below.

Embodiments of the portal 160 further include an output generation unit 140. In some embodiments, the output generation unit 140 may be configured to receive collaborative output from the collaborative interface unit 130 and generate output data. Data generated by the output generation unit 140 may be communicated to a data store 115 (e.g., directly or over the network 110, or to the workstations 104. In some embodiments, the output data generated by the output generation unit 140 may be music output 106. In other embodiments, the output data generated by the output generation unit 140 may be usable by the workstations 104 for generating music output 106.

Figure 2:
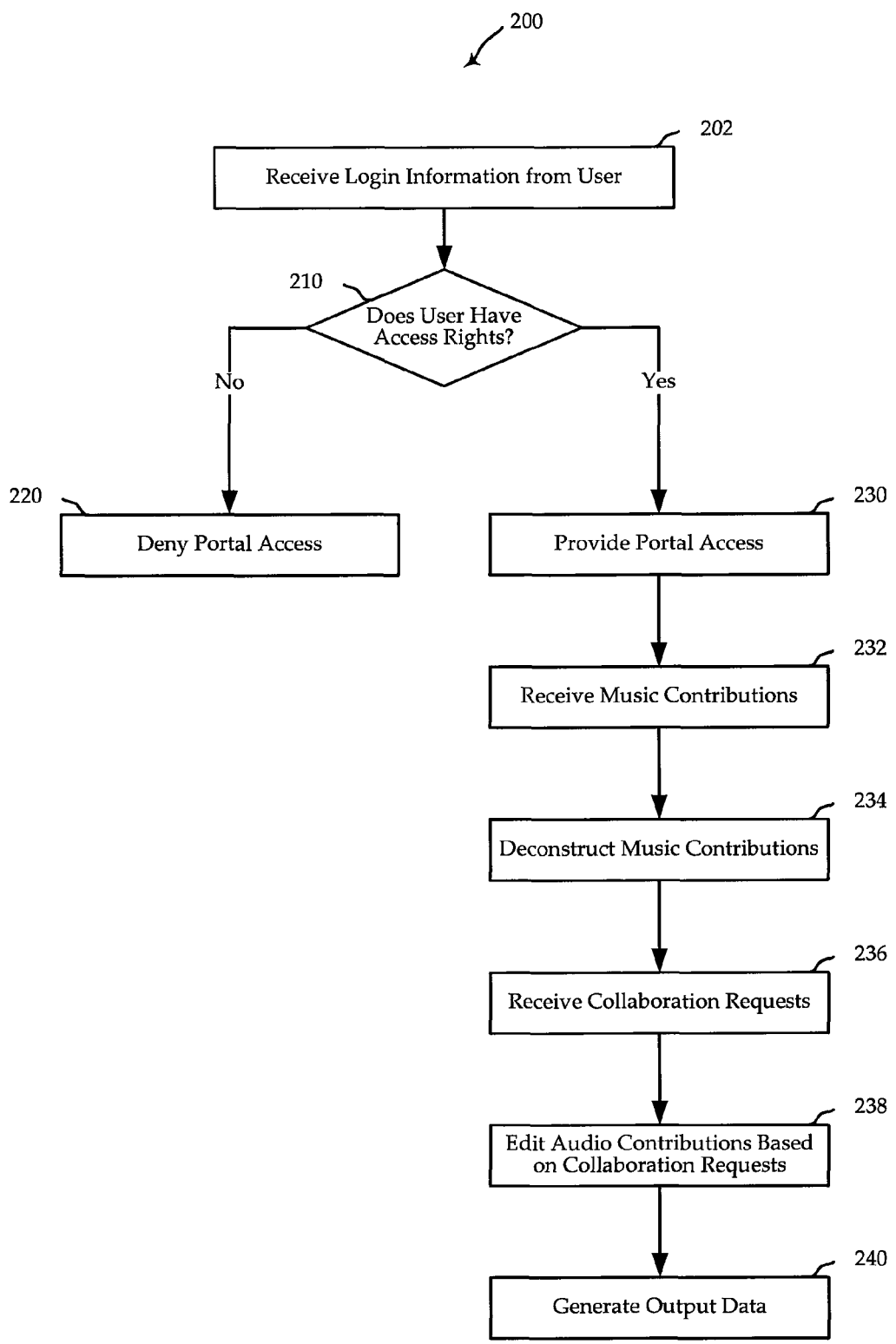
FIG. 2 shows a flow diagram of an exemplary method for collaborative handling of music contributions according to the invention.

FIG. 2 shows a flow diagram of an exemplary method 200 for collaborative handling of music contributions according to the invention. Some embodiments of the method 200 may be performed using a system like the system 100 shown in FIG. 1. The method 200 begins at block 202 by receiving login information for authenticating a user. At block 210, the method 200 determines, based on the login information, whether the user has rights to access the portal. If the user does not have sufficient access rights, access to the portal may be denied at block 220. If the user does have sufficient access rights, access to the portal may be provided at block 230.

At block 232, the portal may receive music contributions. Some music contributions may be received from the user who logged into the portal or from another user (e.g., via the user's workstation and over the network). Other music contributions may be received from one or more data stores. In certain cases, some or all of the music contributions received at block 232 may be deconstructed at block 234 into music elements. The deconstruction may be performed at one or more levels for different purposes, as described further below.

At block 236, the portal may receive collaboration requests from one or more users. The collaboration requests may include any request relating to handling collaboration between users, handling file management, handling editing, compiling, or viewing of music contributions, etc. In one embodiment, a collaboration request includes a request to edit the music contribution on the portal. At block 238, the music contribution is edited in response to, and based at least in part on, the collaboration request. Output data may then be generated at block 240. For example, the output data generated at block 240 may include information relating to the edit performed in block 238.

It will be appreciated that the embodiments described with respect to FIGS. 1 and 2 are intended to provide an overview of an exemplary construction and exemplary functionality of the invention. As such, the descriptions provided above should not be construed as limiting the scope of the invention. For additional clarity, further descriptions of certain functionality are discussed further below.

Music Input

Figure 3:
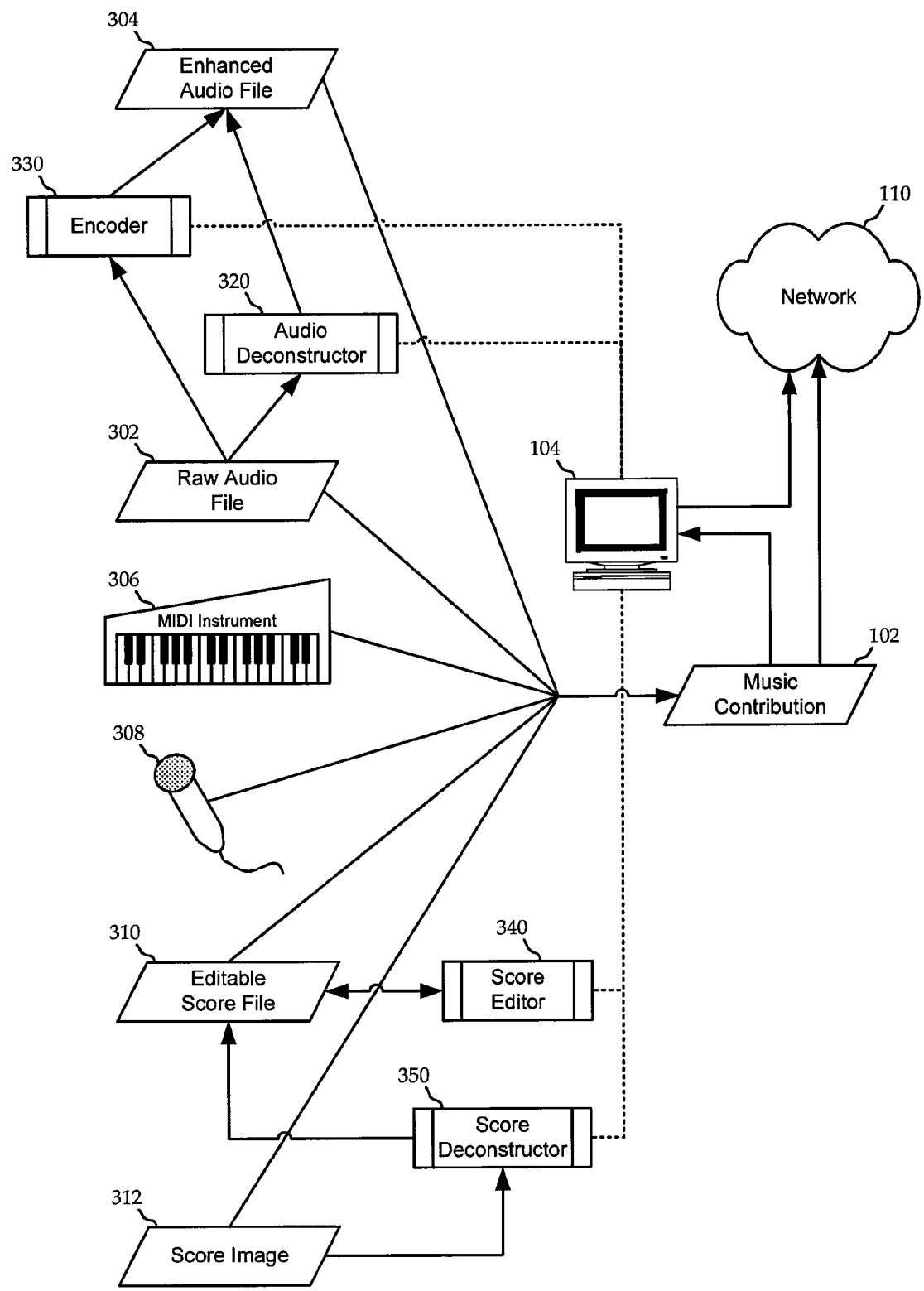
FIG. 3 shows various illustrative types of music inputs for generating a music contribution according to the invention.

Many different types of music input are possible for generating a music contribution. FIG. 3 shows various illustrative types of music inputs for generating a music contribution according to the invention. It will be appreciated that the music input devices shown in FIG. 3 provide only some of the many possible music input devices and should not be construed as limiting the capabilities of the invention.

One embodiment of music input includes a raw audio file 302. The raw audio file 302 may include audio signal data that has been digitized into a digital signal representation. For example, the digital signal information may include samples, each having a time stamp and a voltage level, where the samples represent an analog version of the audio signal. In other examples, the digital signal information may be encoded to represent the audio signal algorithmically (e.g., including error correction information, codec information, etc.).

Another embodiment of music input includes an enhanced audio file 304. The enhanced audio file 304 may include information to supplement or supplant the data present in the raw audio file 302. In certain embodiments, the enhanced audio file 304 may include metadata about the contents of the file, its format, or other useful information. For example, the metadata may include information manually entered about the audio file, including a track name, album name, artist name, genre, etc. In another example, the metadata may be compatible with other systems (e.g., the album serial number and the track number for the song may be supplied in metadata to allow a certain database search to return other information about the song, like its title).

Some embodiments of enhanced audio files 304 are created by passing a raw audio file 302 through an encoder 330. For example, an enhanced audio file 304 may be generated by an MPEG-7 encoder, which may use XML to store metadata and to attach metadata to certain timestamps within the enhanced audio file 304. In other embodiments, the enhanced audio file 304 may be generated by passing the raw audio file 302 through an audio deconstructor 320. The audio deconstructor 320 may deconstruct music elements from the raw audio file 302 (as described more fully below) and store them in the enhanced audio file 304.

Yet another embodiment of music input includes digitized output from a compatible instrument 306. In one embodiment, a Musical Instrumental Digital Interface (MIDI) instrument (e.g., a keyboard) is used to generate MIDI data. The MIDI data may include music elements. In some cases, the included music elements may be used to generate other music elements. For example, the MIDI data may include note pitches, which can be analyzed to determine key. In other embodiments, a compatible instrument 306 may be operable to output data in a usable format. For example, a keyboard may have digital coaxial, optical, or other types of outputs that may be compatible with other components.

Still another embodiment of music input includes analog output from a sensor 308. In one embodiment, one or more microphones are used to detect pressure waves generated by one or more instruments and convert them into an analog audio signal. In another embodiment, an electromagnetic pick-up is used to translate the movement in the steel strings of an electric guitar into an analog audio signal.

Even another embodiment of music input includes an editable score file 310. The editable score file 310 may be any type of file which includes editable score data. For example, the editable score file 310 may have been generated using score editing software 340. Some embodiments of music input include score image 312. Embodiments of the score image 312 may include any type of usable digital image. In one embodiment, the score image 312 is a digitized representation of a physical score print-out (e.g., sheet music), created by converting the printed score into a digital image via an image capture device (e.g., a scanner, a digital still or video camera, etc.). In other embodiments, the score image 312 is converted into an editable score file 310 by passing the score image 312 through a score deconstructor 350. The score deconstructor 350 may be operable to deconstruct music elements from the score image 312, as described more fully below.

In certain embodiments, the encoder 330, audio deconstructor 320, score deconstructor 350, score editor 340, or other applications may be resident on a workstation 104 (or a server computer). In other embodiments, the music input may be, or may be used to generate, a music contribution 102 for collaboration. The contribution 102 may then be communicated to a workstation 104, a network 110, or any other location useful for providing collaboration functionality.

Audio Deconstruction

In some embodiments of the invention, it may be desirable to provide deconstruction of music elements from music input data, like audio signal data and score image data. It will be appreciated that there are many ways of deconstructing music elements from different types of music input data. In some cases, the data may be stored in an audio file in a manner which is simple to deconstruct. For example, music element data may be stored as header information in an enhanced audio file. In other cases, however, certain types of music elements may be non-trivial to extract from the music input data.

Figure 4A:
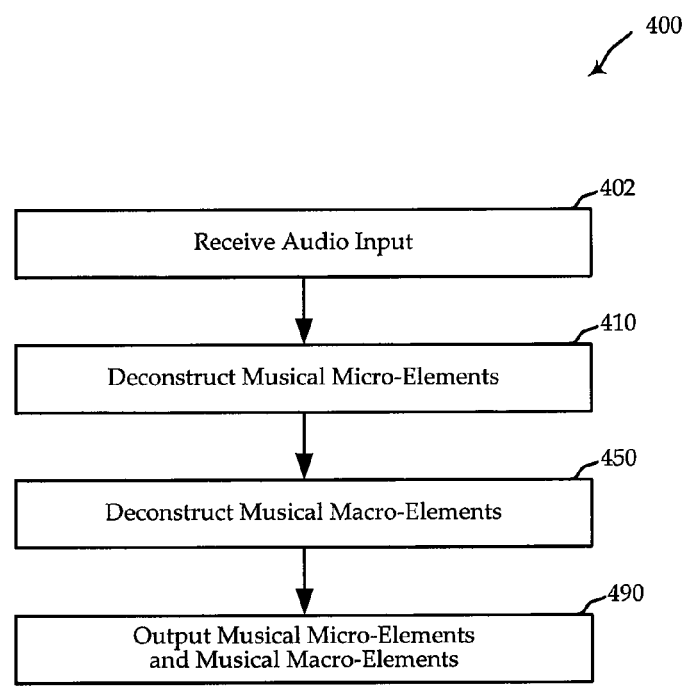
FIG. 4A shows a flow diagram of a method for deconstructing music input data according to the invention.

FIG. 4A shows a flow diagram of a method 400 for deconstructing music input data according to the invention. The method 400 begins by receiving the music input data at block 402. In some embodiments, the music input received at block 402 may include a music contribution for collaboration.

At block 410, music micro-elements are deconstructed from the music input. By way of example, music micro-elements may include note pitches and values, time stamps, note envelopes and timbres, keys, tempos, and other similar elements. In certain embodiments, music micro-elements may include groups of other music micro-elements (e.g., tied notes, triplets, notes grouped by track or instrument, notes grouped by measure, notes grouped by contributor, etc.). In other embodiments, music micro-elements may include components of other music micro-elements (e.g., stems, flags, dots, etc.).

At block 450, music macro-elements are deconstructed. By way of example, music macro-elements may include information generated from analyzing groups and patterns of music micro-elements. In some embodiments, music macro-elements include local or global pattern information relating to groups of music micro-elements (e.g., rhythm signatures, repeated motifs, chord/key changes, form (e.g., A-B-A, or Chorus-Verse-Verse-Chorus), etc.). In other embodiments, music macro-elements include statistical information derived from sets of music micro-elements (e.g., histograms of note or rhythm patterns, etc.). The music micro-elements and macro-elements may then be output at block 490.

Figure 4B:
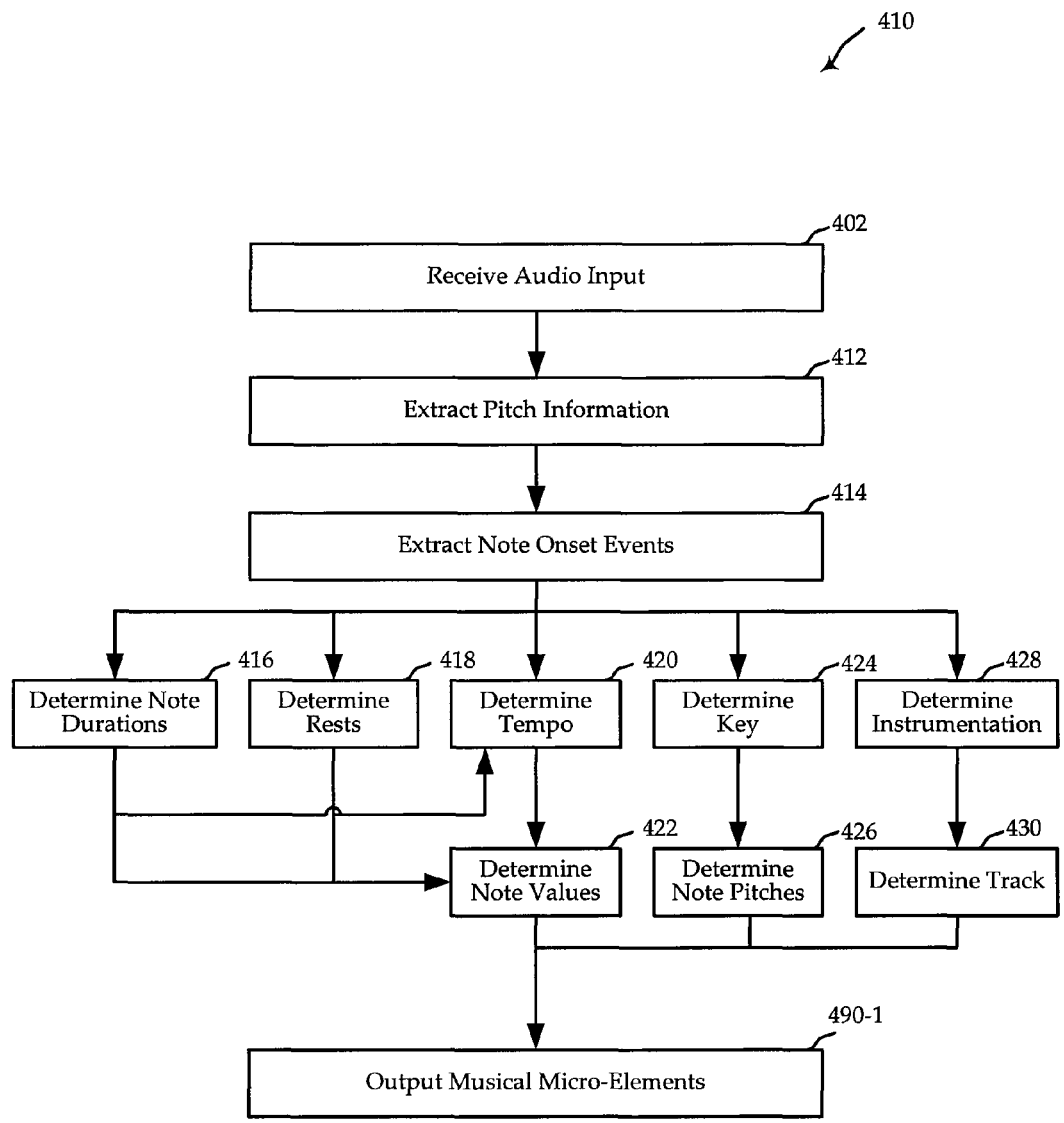
FIG. 4B shows an embodiment of a method for deconstructing music micro-elements according to the invention.

FIG. 4B shows an embodiment of the method 410 for deconstructing music micro-elements according to the invention. The method 410 begins at block 402 by receiving a music input signal. In some embodiments, the music input signal may be preprocessed. For example, the audio signal may be converted from analog to digital, down-converted to a lower sample rate, transcoded for compatibility with certain encoders or decoders, parsed into monophonic audio tracks, or any other useful preprocessing.

In some embodiments, pitch information is extracted in block 412 and note onset events are extracted at block 414. In some embodiments of the method 410, the pitch information extracted in block 412 and the note onset events extracted in block 414 are used to extract and process other information from the audio signal received at block 402.

In certain embodiments, the information is used to determine note durations at block 416, to determine rests at block 418, to determine tempos over time windows at block 420, to determine keys over windows at block 424, and to determine instrumentation at block 428. In other embodiments, the note durations determined at block 416, rests determined at block 418, and tempos determined at block 420 are used to determine note values at block 422; the keys determined at block 424 are used to determine key pitch designations at block 426; and the instrumentation determined at block 428 is used to determine tracks at block 430. In various embodiments, the outputs of blocks 412-430 are configured to be used to generate output as music micro-elements at block 490-1.

Figure 4C:
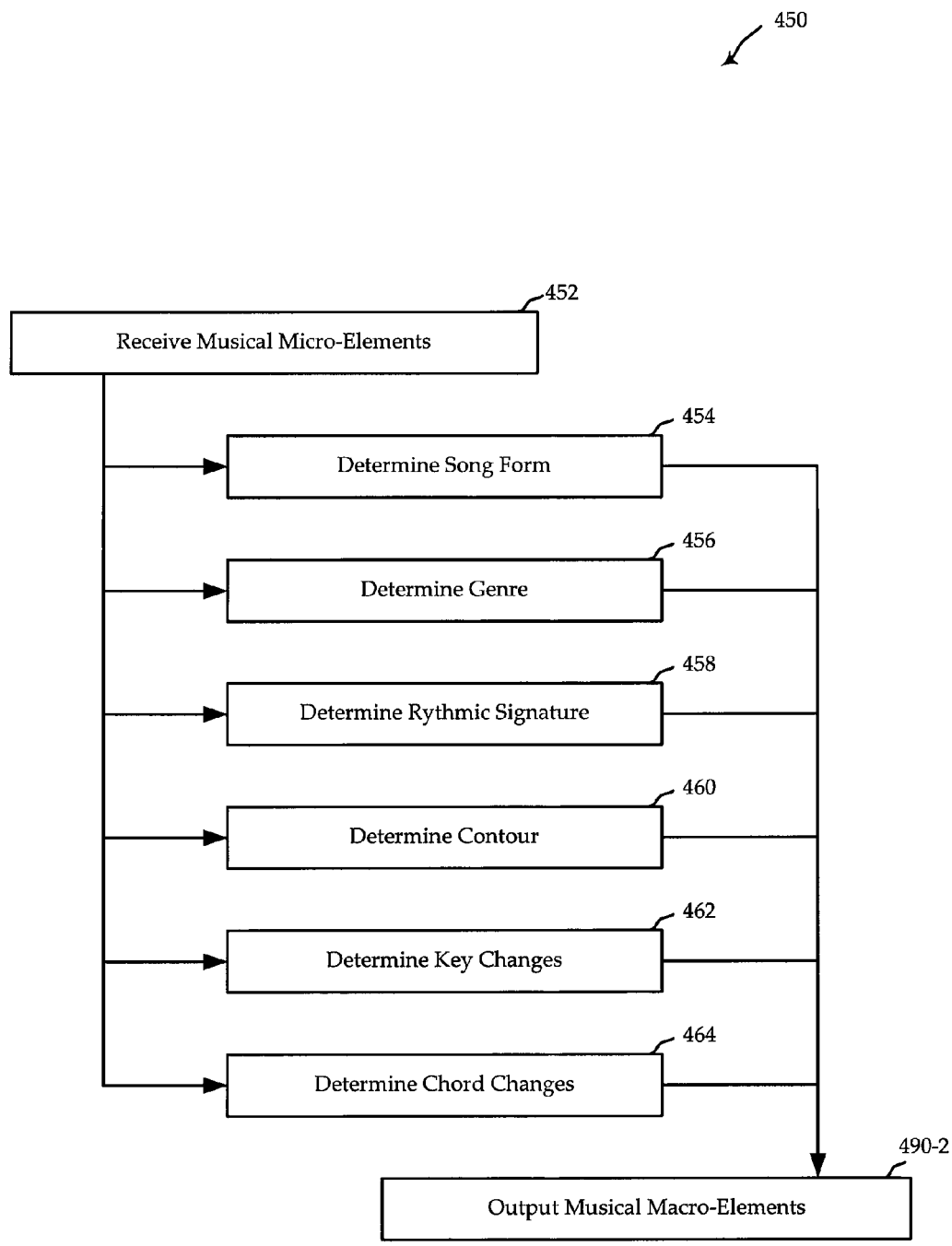
FIG. 4C shows an embodiment of a method for deconstructing music macro-elements according to the invention.

FIG. 4C shows an embodiment of a method 450 for deconstructing music macro-elements according to the invention. The method 450 begins at block 452 by receiving music micro-elements (e.g., from the method 410 of FIG. 4B). The music micro-elements may be used to generate a number of types of music macro-elements.

In some embodiments, the music micro-elements are used to determine song form at block 454 (e.g., Intro-Verse-Chorus-Verse-Bridge-Chorus-Chorus-Outro); to determine genre at block 456 (e.g., rock, classical, jazz, Indian classical, etc.); to determine rhythmic signature at block 458 (e.g., the first movement is in 4/4 meter at a tempo of 90 beats per minute (bpm), the second movement is in 3/4 meter at a tempo of 120 bpm, and the third movement returns to 4/4 time, while remaining at a tempo of 120 bpm); to determine contour at block 460 (e.g., the song begins with only drums and bass at a relatively low volume and fast tempo, and after one minute, the song adds a clean guitar line at a medium volume and a slower tempo); to determine key changes at block 462 (e.g., the song begins in the key of C-major, modulates to F-major, quickly modulates through D-minor and G-major, and returns to C-major); and to determine chord changes at block 464 (e.g., a portion of the song changes from $Am^7$ to $Dm^7$ to $Gm^7$ to $C^7$ to $F^6$, or the song changes from $iii^7$ to $vi^7$ to $ii^7$ to $V^7$ to $I^6$). In various embodiments, the outputs of blocks 454-464 are configured to be used to generate output as music macro-elements at block 490-2.

It will be appreciated that many other types of music micro-elements and music macro-elements are possible according to the invention. Further, depending on the types of music elements needed for collaboration, a music input signal may be deconstructed at many different levels. For example, a temporary drum track may be used only to provide rhythmic information. In that case, it may be a waste of resources to deconstruct or save music elements relating to pitch, timbre, key, etc. In another example, a vocal line may be used to provide a general guideline for the contour of pitch changes throughout a section of a song. In that case, it may not be important to deconstruct precise pitches, note durations, etc.; rather it may be more efficient to extract only the general direction of pitch movement with approximate pitch values and durations.

Figure 5A:
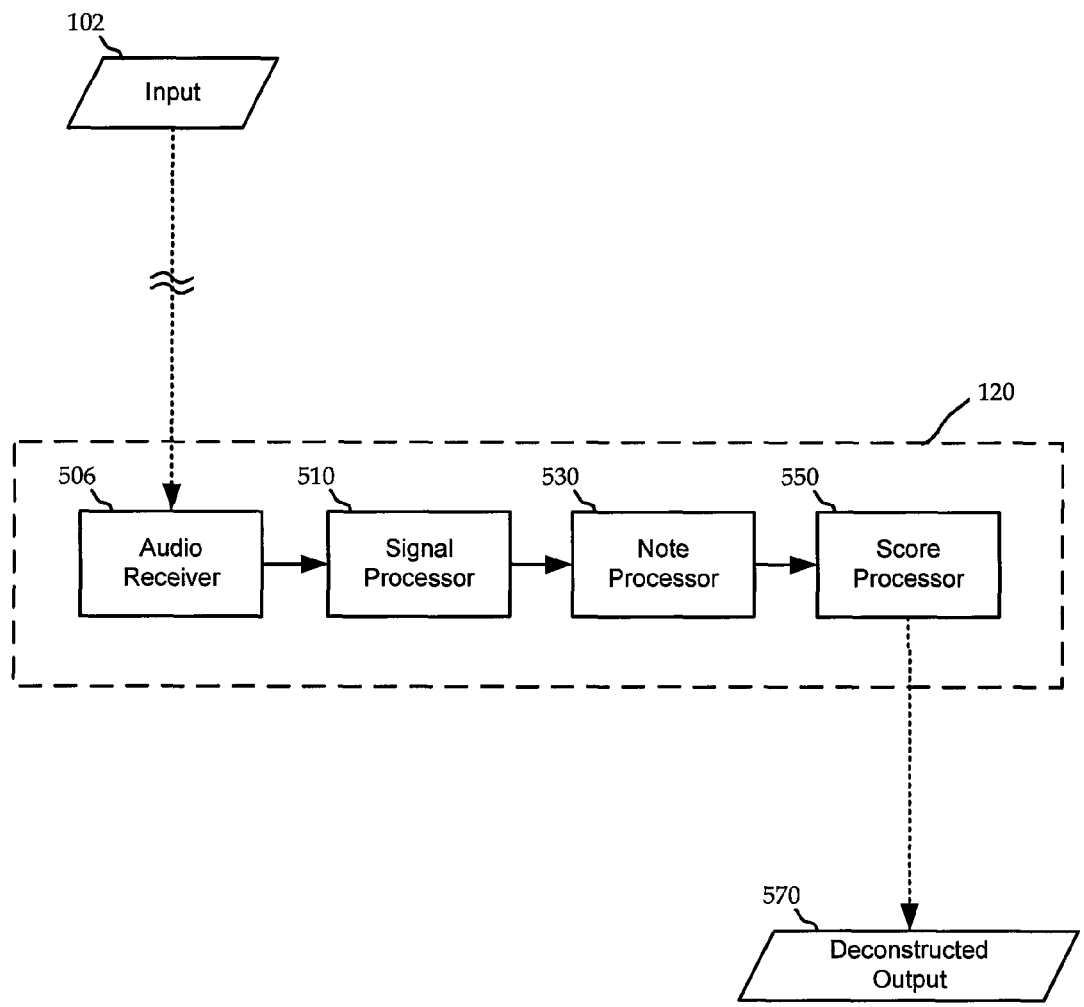
FIG. 5A shows a simplified block diagram of an exemplary system for deconstructing audio signal input to generate music elements according to the invention.

It will be further appreciated that, depending on the type of music data available and various application needs, there may be many ways to deconstruct music elements from the music input. FIG. 5A shows a simplified block diagram of an exemplary system for deconstructing an audio signal input to generate music elements according to embodiments of the invention. As shown, the input 102 is received by a music deconstruction unit 120, which deconstructs the input 102 to generate deconstructed output 570.

In some embodiments, the input 102 is received by the musical deconstruction unit 120 at an audio receiver unit 506. In one embodiment, a composition is received in real time by a microphone or microphone array and transduced to an analog electrical input 102 for receipt by the audio receiver unit 506. In other embodiments, the input 102 may comprise digital data, such as a recorded music file suitable for playback. If the input 102 is an analog signal, it may be converted by the audio receiver unit 506 into a digital representation in preparation for digital signal processing by a signal processor unit 510, a note processor unit 530, and a score processor unit 550. When the input 102 is received in real time, there may be no way to predetermine the full length of the input 102. As such, the input 102 may be received and stored in predetermined intervals (e.g., an amount of elapsed time, number of digital samples, amounts of memory used, etc.), and may be processed accordingly. In another embodiment, a recorded sound clip is received by the audio receiver 5060 and digitized, thereby having a fixed time duration.

Figure 5B:
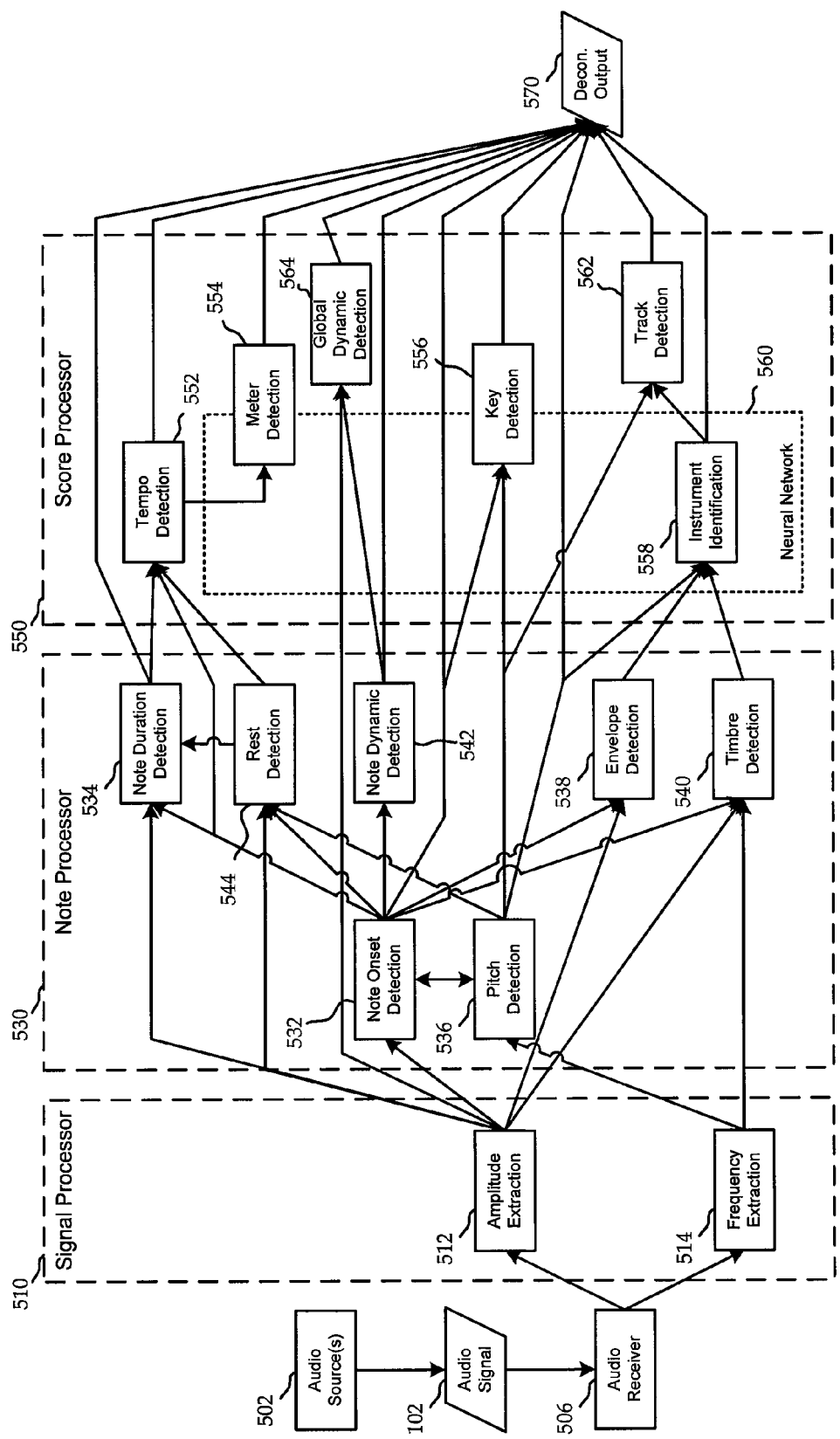
FIG. 5B shows a lower-level block diagram of one embodiment of an audio deconstruction unit according to the invention.

A lower-level block diagram of one embodiment of the music deconstruction unit 120 is provided in FIG. 5B. One or more audio sources 502 may be used to generate a music input signal 102. The audio source 502 may be anything capable of providing a music input signal 102 to the audio receiver 506. In some embodiments, one or more microphones, transducers, and/or other sensors are used as audio sources 502. The microphones may convert pressure or electromagnetic waves from a live performance (or playback of a recorded performance) into an electrical signal for use as a music input signal 102. For example, in a live audio performance, a microphone may be used to sense and convert audio from a singer, while electromagnetic "pick-ups" may be used to sense and convert audio from a guitar and a bass. In other embodiments, audio sources 502 may include analog or digital devices configured to provide a music input signal 102 or an audio file from which a music input signal 102 may be read. For example, digitized audio files may be stored on storage media in an audio format and provided by the storage media as a music input signal 102 to the audio receiver 506.

It will be appreciated that, depending on the audio source 502, the music input signal 102 may have different characteristics. The music input signal 102 may be monophonic or polyphonic, may include multiple tracks of audio data, may include audio from many types of instruments, and may include certain file formatting, etc. Similarly, it will be appreciated that the audio receiver 506 may be anything capable of receiving the music input signal 102. Further, the audio receiver 506 may include one or more ports, decoders, or other components necessary to interface with the audio sources 502, or receive or interpret the music input signal 102.

The audio receiver 506 may provide additional functionality. In one embodiment, the audio receiver 506 converts analog music input signals 102 to digital music input signals 102. In another embodiment, the audio receiver 506 is configured to down-convert the music input signal 102 to a lower sample rate to reduce the computational burden to the system 500. In one embodiment, the music input signal 102 is down-sampled to around 8-9 kHz. This may provide higher frequency resolution of the music input signal 102, and may reduce certain constraints on the design of the system 500 (e.g., filter specifications).

In yet another embodiment, the audio receiver 506 includes a threshold detection component, configured to begin receiving the music input signal 102 (e.g., start recording) on detection of audio levels exceeding certain thresholds. For example, the threshold detection component may analyze the audio over a specified time period to detect whether the amplitude of the music input signal 102 remains above a predetermined threshold for some predetermined amount of time. The threshold detection component may be further configured to stop receiving the music input signal 102 (e.g., stop recording) when the amplitude of the music input signal 102 drops below a predetermined threshold for a predetermined amount of time. In still another embodiment, the threshold detection component may be used to generate a flag for the system 500 representing the condition of the music input signal 102 amplitude exceeding or falling below a threshold for an amount of time, rather than actually beginning or ending receipt of the music input signal 102.

According to FIG. 5B, the audio receiver 506 passes the music input signal 102 to the signal processor unit 510, which includes an amplitude extraction unit 512 and a frequency extraction unit 514. The amplitude extraction unit 512 is configured to extract amplitude-related information from the music input signal 102. The frequency extraction unit 514 is configured to extract frequency-related information from the music input signal 102.

In one embodiment, the frequency extraction unit 514 transforms the signal from the time domain into the frequency domain using a transform algorithm. For example, while in the time domain, the music input signal 102 may be represented as changes in amplitude over time. However, after applying a Fast Fourier Transform (FFT) algorithm, the same music input signal 102 may be represented as a graph of the amplitudes of each of its frequency components, (e.g., the relative strength or contribution of each frequency band in a range of frequencies, like an overtone series, over which the signal will be processed). For processing efficiency, in may be desirable to limit the algorithm to a certain frequency range. For example, the frequency range may only cover the audible spectrum (e.g., approximately 20 Hz to 20 kHz).

In various embodiments, the signal processor unit 510 may extract frequency-related information in other ways. For example, many transform algorithms output a signal in linear frequency "buckets" of fixed width. This may limit the potential frequency resolution or efficacy of the transform, especially given that the audio signal may be inherently logarithmic in nature (rather than linear). Many algorithms are known in the art for extracting frequency-related information from the music input signal 102.

The amplitude-related information extracted by the amplitude extraction unit 512 and the frequency-related information extracted by the frequency extraction unit 514 may then be used by various components of the note processing unit 530. In some embodiments, the note processing unit 530 includes all or some of a note onset detector unit 532, a note duration detector unit 534, a pitch detector unit 536, a rest detector unit 544, an envelope detector unit 538, a timbre detector unit 540, and a note dynamic detector unit 542.

The note onset detector unit 532 is configured to detect the onset of a note. The onset (or beginning) of a note typically manifests in music as a change in pitch (e.g., a slur), a change in amplitude (e.g., an attach portion of an envelope), or some combination of a change in pitch and amplitude. As such, the note onset detector unit 532 may be configured to generate a note onset event whenever there is a certain type of change in frequency (or pitch) and/or amplitude.

Musical notes may also be characterized by their duration (e.g., the amount of time a note lasts in seconds or number of samples). In some embodiments, the note processing unit 530 includes a note duration detector unit 534, configured to detect the duration of a note marked by a note onset event.

It is worth noting that certain characteristics of music are psychoacoustic, rather than being purely physical attributes of a signal. For example, frequency is a physical property of a signal (e.g., representing the number of cycles-per-second traveled by a sinusoidal wave), but pitch is a more complex psychoacoustic phenomenon. One reason is that a note of a single pitch played by an instrument is usually made up of a number of frequencies, each at a different amplitude, known as the timbre. The brain may sense one of those frequencies (e.g., typically the fundamental frequency) as the "pitch," while sensing the other frequencies merely as adding "harmonic color" to the note. In some cases, the pitch of a note experienced by a listener may be a frequency that is mostly or completely absent from the signal.

In some embodiments, the note processing unit 530 includes a pitch detector unit 536, configured to detect the pitch of a note marked by a note onset event. In other embodiments, the pitch detector unit 536 is configured to track the pitch of the music input signal 102, rather than (or in addition to) tracking the pitches of individual notes. It will be appreciated that the pitch detector unit 536 may be used by the note onset detector unit 532 in some cases to determine a change in pitch of the music input signal 102 exceeding a threshold value.

Some embodiments of the note processing unit 530 include a rest detector unit 544 configured to detect the presence of rests within the music input signal 102. One embodiment of the rest detector unit 544 uses amplitude-related information extracted by the amplitude extraction unit 512 and confidence information derived by the pitch detector unit 536. For example, amplitude-related information may reveal that the amplitude of the music input signal 102 is relatively low (e.g., at or near the noise floor) over some window of time. Over the same window of time, the pitch detector unit 536 may determine that there is very low confidence of the presence of any particular pitch. Using this and other information, the rest detector unit 544 detects the presence of a rest, and a time location where the rest likely began.

In some embodiments, the note processing unit 530 includes a timbre detector unit 540. Amplitude-related information extracted by the amplitude extraction unit 512 and frequency-related information extracted by the frequency extraction unit 514 may be used by the timbre detector unit 540 to detect timbre information for a portion of the music input signal 102. The timbre information may reveal the harmonic composition of the portion of the audio signal 102. In some embodiments, the timbre detector unit 540 may detect timbre information relating to a particular note beginning at a note onset event.

In one embodiment of the timbre detector unit 540, the amplitude-related information and frequency-related information are convolved with a Gaussian filter to generate a filtered spectrum. The filtered spectrum may then be used to generate an envelope around a pitch detected by the pitch detector unit 536. This envelope may correspond to the timbre of the note at that pitch.

In some embodiments, the note processing unit 530 includes an envelope detector unit 538. Amplitude-related information extracted by the amplitude extraction unit 512 may be used by the envelope detector unit 538 to detect envelope information for a portion of the music input signal 102. For example, hitting a key on a piano may cause a hammer to strike a set of strings, resulting in an audio signal with a large attack amplitude. This amplitude quickly goes through a decay, until it sustains at a somewhat steady-state amplitude where the strings resonate (of course, the amplitude may slowly lessen over this portion of the envelope as the energy in the strings is used up). Finally, when the piano key is released, a damper lands on the strings, causing the amplitude to quickly drop to zero. This type of envelope is typically referred to as an ADSR (attack, decay, sustain, release) envelope. The envelope detector unit 538 may be configured to detect some or all of the portions of an ADSR envelope, or any other type of useful envelope information.

In various embodiments, the note processing unit 530 also includes a note dynamic detector unit 542. In certain embodiments, the note dynamic detector unit 542 provides similar functionality to the envelope detector unit 538 for specific notes beginning at certain note onset events. In other embodiments, the note dynamic detector unit 542 is configured to detect note envelopes that are either abnormal with respect to a pattern of envelopes being detected by the envelope detector unit 538 or that fit a certain predefined pattern. For example, a staccato note may be characterized by sharp attack and short sustain portions of its ADSR envelope. In another example, an accented note may be characterized by an attack amplitude significantly greater than those of surrounding notes.

It will be appreciated that the note dynamic detector unit 542 and other note processing units may be used to identify multiple other attributes of a note which may be desirable as part of deconstructed output 570. For example, notes may be marked as slurred, as accented, as staccato, as grace notes, etc. Many other note characteristics may be extracted according to the invention.

Information relating to multiple notes or note onset events (including rests) may be used to generate other information. According to the embodiment of FIG. 5B, various components of the note processing unit 530 may be in operative communication with various components of the score processing unit 550. The score processing unit 550 may include all or some of a tempo detection unit 552, a meter detection unit 554, a key detection unit 556, an instrument identification unit 558, a track detection unit 562, and a global dynamic detection unit 564.

In some embodiments, the score processing unit 550 includes a tempo detection unit 552, configured to detect the tempo of the music input signal 102 over a window of time. Typically, the tempo of a piece of music (e.g., the speed at which the music seems to pass psycho-acoustically) may be affected in part by the presence and duration of notes and rests. As such, certain embodiments of the tempo detection unit 552 use information from the note onset detector unit 532, the note duration detector unit 534, and the rest detector unit 544 to determine tempo. Other embodiments of the tempo detection unit 552 further use the determined tempo to assign note values (e.g., quarter note, eighth note, etc.) to notes and rests.

Meter dictates how many beats are in each measure of music, and which note value it considered a single beat. For example, a meter of 4/4 represents that each measure has four beats (the numerator) and that a single beat is represented by a quarter note (the denominator). For this reason, meter may help determine note and bar line locations, and other information which may be needed to provide a useful deconstructed output 570. In some embodiments, the score processing unit 550 includes a meter detection unit 554, configured to detect the meter of the music input signal 102.

In some embodiments, simple meters are inferred from tempo information and note values extracted by the tempo detection unit 552 and from other information (e.g., note dynamic information extracted by the note dynamic detector unit 542). Usually, however, determining meter is a complex task involving complex pattern recognition.

For example, say the following sequence of note values is extracted from the music input signal 102: quarter note, quarter note, eighth note, eighth note, eighth note, eighth note. This simple sequence could be represented as one measure of 4/4, two measures of 2/4, four measures of 1/4, one measure of 8/8, or many other meters. Assuming there was an accent (e.g., an increased attack amplitude) on the first quarter note and the first eighth note, this may make it more likely that the sequence is either two measures of 2/4, two measures of 4/8, or one measure of 4/4. Further, assuming that 4/8 is a very uncommon meter may be enough to eliminate that as a guess. Even further, knowledge that the genre of the music input signal 102 is a folk song may make it more likely that 4/4 is the most likely meter candidate.

The example above illustrates the complexities involved even with a very simple note value sequence. Many note sequences are much more complex, involving many notes of different values, notes which span multiple measures, dotted and grace notes, syncopation, and other difficulties in interpreting meter. For this reason, traditional computing algorithms may have difficulty accurately determining meter. As such, various embodiments of the meter detection unit 554 use an artificial neural network (ANN) 560, trained to detect those complex patterns. The ANN 560 may be trained by providing the ANN 560 with many samples of different meters and cost functions that refine with each sample. In some embodiments, the ANN 560 is trained using a learning paradigm. The learning paradigm may include, for example, supervised learning, unsupervised learning, or reinforcement learning algorithms.

It will be appreciated that many useful types of information may be generated for use as music elements or deconstructed output 570 by using either or both of the tempo and meter information. For example, the information may allow a determination of where to bar notes together (e.g., as sets of eighth notes) rather than designating the notes individually with flags; when to split a note across two measures and tie it together; or when to designate sets of notes as triplets (or higher-order sets), grace notes, trills or mordents, glissandos; etc.

Another set of information which may be useful in generating music elements or deconstructed output 570 relates to the key of a section of the music input signal 102. Key information may include, for example, an identified root pitch and an associated modality. For example, "A minor" represents that the root pitch of the key is "A" and the modality is minor. Each key is characterized by a key signature, which identifies the notes which are "in the key" (e.g., part of the diatonic scale associated with the key) and "outside the key" (e.g., accidentals in the paradigm of the key). "A minor," for example, contains no sharps or flats, while "D major" contains two sharps and no flats.

In some embodiments, the score processing unit 550 includes a key detection unit 556, configured to detect the key of the music input signal 102. Some embodiments of the key detection unit 556 determine key based on comparing pitch sequences to a set of cost functions. The cost functions may, for example, seek to minimize the number of accidentals in a piece of music over a specified window of time. In other embodiments, the key detection unit 556 may use an artificial neural network to make or refine complex key determinations. In yet other embodiments, a sequence of key changes may be evaluated against cost functions to refine key determinations. In still other embodiments, key information derived by the key detection unit 556 may be used to attribute notes (or note onset events) with particular key pitch designations. For example, a "B" in F major may be designated as "B-natural." Of course, key information may be used to generate a key signature or other information for the music score representation. In some embodiments, the key information may be further used to generate chord or other harmonic information. For example, guitar chords may be generated in tablature format, or jazz chords may be provided.

In other embodiments, the score processing unit 550 also includes an instrument identification unit 558, configured to identify an instrument being played on the music input signal 102. Often, an instrument is said to have a particular timbre. However, there may be differences in timbre on a single instrument depending on the note being played or the way the note is being played. For example, the timbre of every violin differs based, for example, on the materials used in its construction, the touch of the performer, the note being played (e.g., a note played on an open string has a different timbre from the same note played on a fingered string, and a note low in the violin's register has a different timbre from a note in the upper register), whether the note is bowed or plucked, etc. Still, however, there may be enough similarity between violin notes to identify them as violins, as opposed to another instrument.

Embodiments of the instrument identification unit 558 are configured to compare characteristics of single or multiple notes to determine the range of pitches apparently being played by an instrument of the music input signal 102, the timbre being produced by the instrument at each of those pitches, and/or the amplitude envelope of notes being played on the instrument. In one embodiment, timbre differences are used to detect different instruments by comparing typical timbre signatures of instrument samples to detected timbres from the music input signal 102. For example, even when playing the same note at the same volume for the same duration, a saxophone and a piano may sound very different because of their different timbres. Of course, as mentioned above, identifications based on timbre alone may be of limited accuracy.

In another embodiment, pitch ranges are used to detect different instruments. For example, a cello may typically play notes ranging from about two octaves below middle C to about one octave above middle C. A violin, however, may typically play notes ranging from just below middle C to about four octaves above middle C. Thus, even though a violin and cello may have similar timbres (they are both bowed string instruments), their pitch ranges may be different enough to be used for identification. Of course, errors may be likely, given that the ranges do overlap to some degree. Further, other instruments (e.g., the piano) have larger ranges, which may overlap with many instruments.

In still another embodiment, envelope detection is used to identify different instruments. For example, a note played on a hammered instrument (e.g., a piano) may sound different from the same note being played on a woodwind (e.g., a flute), reed (e.g., oboe), brass (e.g., trumpet), or string (e.g., violin) instrument. Each instrument, however, may be capable of producing many different types of envelope, depending on how a note is played. For example, a violin may be plucked or bowed, or a note may be played legato or staccato.

At least because of the difficulties mentioned above, accurate instrument identification may require detection of complex patterns, involving multiple characteristics of the music input signal 102 possibly over multiple notes. As such, some embodiments of the instrument identification unit 558 utilize an artificial neural network 560 trained to detect combinations of these complex patterns.

Some embodiments of the score processing unit 550 include a track detection unit 562, configured to identify an audio track from within the music input signal 102. In some cases, the music input signal 102 may be in a format which is already separated by track. For example, audio on some Digital Audio Tapes (DATs) may be stored as eight separate digital audio tracks. In these cases, the track detection unit 562 may be configured to simply identify the individual audio tracks.

In other cases, however, multiple tracks may be stored in a single music input signal 102 and need to be identified by extracting certain data from the music input signal. As such, some embodiments of the track detection unit 562 are configured to use information extracted from the music input file 102 to identify separate audio tracks. For example, a performance may include five instruments playing simultaneously (e.g., a jazz quintet). It may be desirable to identify those separate instruments as separate tracks.

Track detection may be accomplished in a number of different ways. In one embodiment, the track detection unit 562 uses pitch detection to determine whether different note sequences appear restricted to certain pitch ranges. In another embodiment, the track detection unit 562 uses instrument identification information from the instrument identification unit 558 to determine different tracks.

Many scores also contain information relating to global dynamics of a composition or performance. Global dynamics refer to dynamics which span more than one note, as opposed to the note dynamics described above. For example, an entire piece or section of a piece may be marked as forte (loud) or piano (soft). In another example, a sequence of notes may gradually swell in a crescendo. To generate this type of information, some embodiments of the score processing unit 550 include a global dynamic detection unit 564. Embodiments of the global dynamic detection unit 564 use amplitude information, in some cases including note dynamic information and/or envelope information, to detect global dynamics.

In certain embodiments, threshold values are predetermined or adaptively generated from the music input signal 102 to aid in dynamics determinations. For example, the average volume of a rock performance may be considered forte. Amplitudes that exceed that average by some amount (e.g., by a threshold, a standard deviation, etc.) may be considered fortissimo, while amplitudes that drop below that average by some amount may be considered piano.

Certain embodiments may further consider the duration over which dynamic changes occur. For example, a piece that starts with two minutes of quiet notes and suddenly switches to a two-minute section of louder notes may be considered as having a piano section followed by a forte section. On the other hand, a quiet piece that swells over the course of a few notes, remains at that higher volume for a few more notes, and then returns to the original amplitude may be considered as having a crescendo followed by a decrescendo.

All the various types of information described above, and any other useful information, may be generated for use as music elements or deconstructed output 570. In addition to the music elements or deconstructed output 570 described with reference to the various components of the system, any number of other music elements or deconstructed output 570 may be generated from the same or other information. In one example, say a note is determined to be a staccato dotted eighth note. Other music 570 elements may include the note body, stem, flag, duration dot, staccato dot, and other characteristics of the note. Even other music elements 570 may include the style and color of the note representation on a display or print-out, the direction of the stem (e.g., the direction may be defaulted or dictated based on its location on the staff, or it may be changed to designate that the note is part of a specific note sequence), the size of the note body (e.g., it may be sized for readability, to distinguish it from other notes, or for some other reason), the shape of the note head (e.g., it may be a different shape for a percussive sound), or any other useful information. In other examples, the music elements or deconstructed output 570 may include staff lines, clefs, measure numbers, lyrics, lyrical alignments, page titles, staff titles, page margins, instrumentation data, playback data, etc. In still other examples, music elements or deconstructed output 570 may include information relating to which collaborator added or edited a portion of a file, whether other collaborators have voted for or against the edit, or other useful collaboration information. The music elements or deconstructed output 570 may be saved or output.

It will be appreciated that the various units and components described above may be implemented in various ways without departing from the invention. For example, certain units may be components of other units, or may be implemented as additional functionality of another unit. Further, the units may be connected in many ways, and data may flow between them in many ways according to the invention. Even further, various embodiments relating to audio deconstruction are described further in U.S. application Ser. No. 12/024,981 entitled "MUSIC TRANSCRIPTION" to Robert D. Taub, et al. filed Feb. 1, 2008, which is incorporated herein by reference for all purposes.

Score Deconstruction

In addition to, or instead of, deconstructing music elements from audio signals, it may be desirable in some cases to deconstruct music elements from score images. Embodiments of the invention are configured to accept score images as input. It will be appreciated that many ways are possible to deconstruct music elements from a score image, or perform score deconstruction.

Figure 6A:
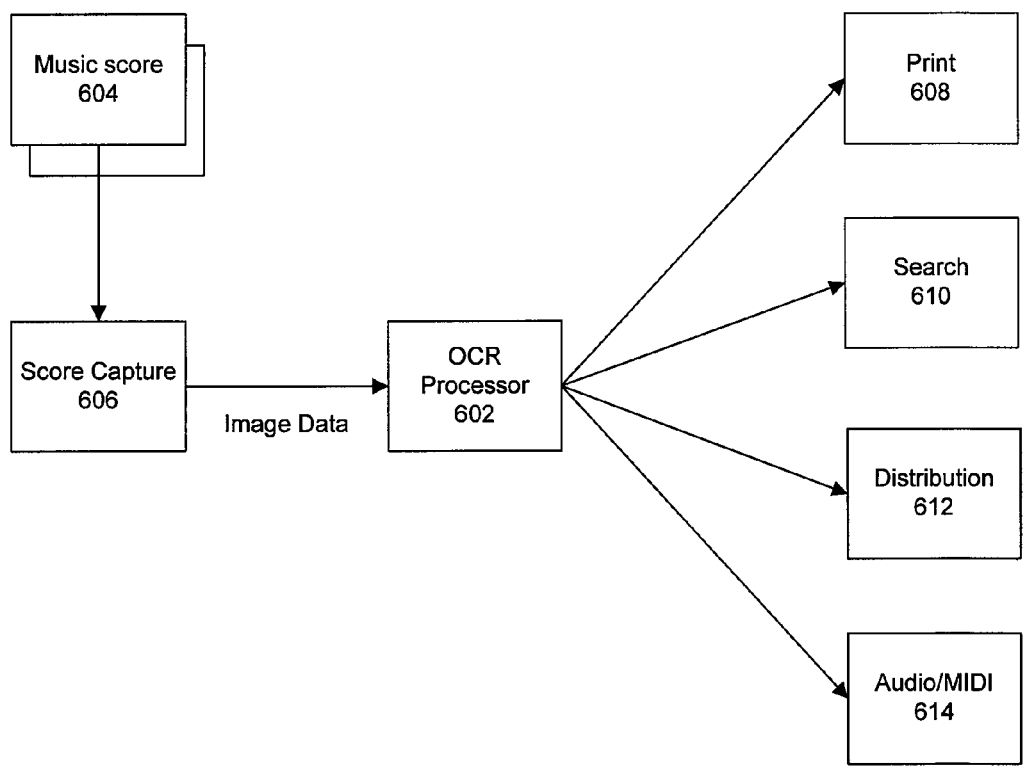
FIG. 6A shows an exemplary system that processes music image data in accordance with the present invention to provide an optical character recognition (OCR) feature.

FIG. 6A shows a system that processes music image data in accordance with the present invention to provide an optical character recognition (OCR) feature. An OCR processor 602 receives image data of a music score 604 that is captured with a score capture device 606, such as a camera or scanner. The OCR processor 602 produces music score output comprising data that corresponds to the music score input, albeit in a digital form that can be put to a variety of uses. The digital representation of the music score can be easily processed by other systems, including but not limited to, printed output, for use by a search mechanism, for distribution and collaboration with multiple users, and for generating audio output such as with MIDI components. For example, FIG. 6A shows that the music score output can be provided to a print function 608, a search function 610, a distribution function 612, and for audio/MIDI output 614.

The captured music score images can be produced with any image capture device, including a webcam, a phone camera, a point-and-shoot camera, as well as other and more sophisticated cameras. Once the image of the music score is captured, it is presented to the OCR processor for adjustments and additional processing.

Figure 6B:
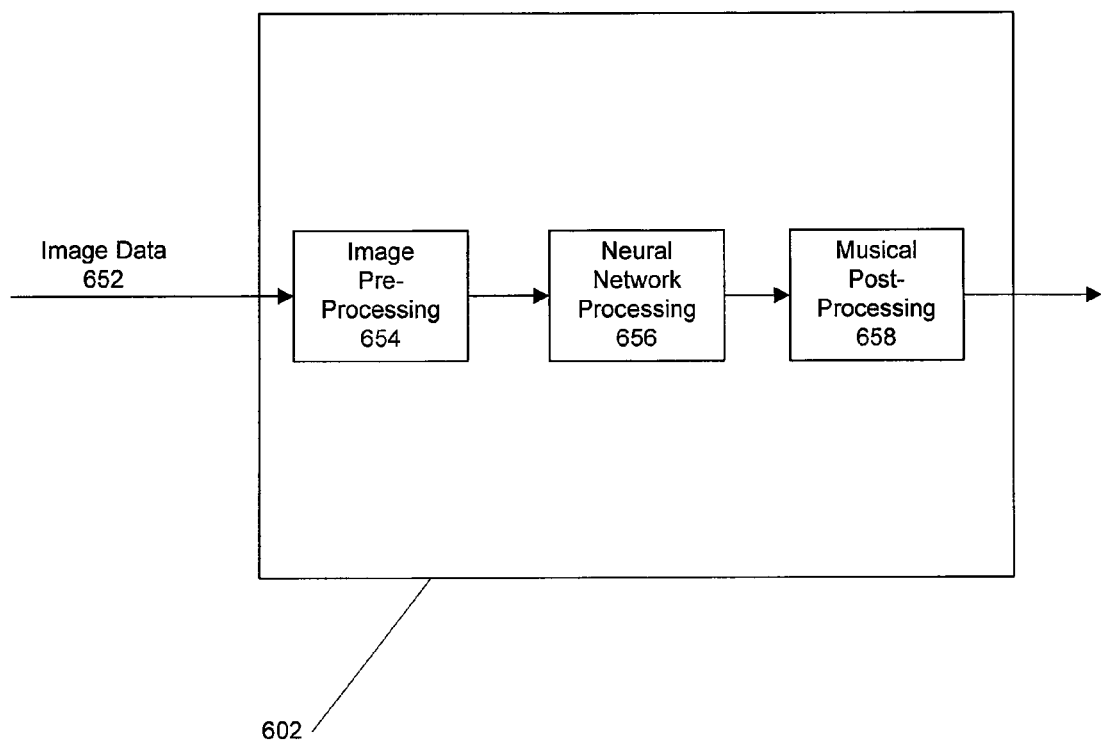
FIG. 6B shows exemplary image data, produced from the capture device shown in FIG. 6A, provided as input to the OCR processor.

FIG. 6B shows the image data 652, produced from the capture device 606 (FIG. 6A), provided as input to the OCR processor 602. FIG. 6B shows that the OCR processor 602 includes an image pre-processing component 654 that receives the image data. The image data may be in the form of, for example, a bitmap image (.bmp), JPEG data, TIFF data, and other file formats commonly used by digital cameras, and the like. The image pre-processing component performs binarization, skew-correction of the image, and removal of irrelevant background components. The binarization operation relates to adjustments for brightness and contrast in the captured image. The skew correction operation relates to correction of images that are rotated from an orientation that aligns music staff lines to be parallel to the bottom edge of the image. The irrelevant background component removal cleans up the image by removing noise artifacts and otherwise unwanted background components. If desired, the preprocessing operations can be performed by external image processing routines or modules.

The pre-processing component 654 provides the resulting data to the neural network (NN) processing component 656. The NN processing component 656 identifies music symbology in the captured image, and performs cognitive processing of the optical image. That is, the neural network performs a computer process that recognizes the music symbols in the captured music image and, where necessary, cognitively interprets the identified symbols and extrapolates from the input data to determine appropriate labels for the artifacts or symbology in the captured image.

The NN processing component 656 comprises a trained neural network that receives the adjusted music score image. If desired, the trained neural network can utilize its output to provide feedback and adjust its operation. Such feedback may entail factor graph operations to utilize back propagation techniques, or to adjust network node weights of the already-trained neural network. Other techniques for using output as feedback will be known to those skilled in the art.

The output of the NN processing component 656 is provided to a post-processing component 658, which produces the output of the NN. The output of the post-processing component can then be provided to various functions, such as the print, search, distribution, and audio functions illustrated in FIG. 6A. The post-processing component performs an interpreting function on the NN output to determine which artifact types identified by the NN are likely correct. The interpretation by the post-processing component 658 is based on confidence values produced by the NN. Those skilled in the art will be familiar with interpretation techniques for NN confidence value output data. The post-processing then produces the OCR processor output in a suitable format, such as musical note information or other information corresponding to the identified musical artifacts. For example, the music information may take the form of an electronic instrument representation, such as the MIDI format, or other data format, or other combination of information.

It will be appreciated that the various units and components described above may be implemented in various ways without departing from the invention. For example, certain units may be components of other units, or may be implemented as additional functionality of another unit. Further, the units may be connected in many ways, and data may flow between them in many ways according to the invention. Even further, various embodiments relating to score decomposition are described further in U.S. Provisional Application No. 61/028, 490, entitled "MUSIC SCORE DECONSTRUCTION" to Robert D. Taub, et al. filed Feb. 13, 2008, which is incorporated herein by reference for all purposes. Other aspects of music score capture techniques may be found in U.S. patent application Ser. No. 11/303,812 entitled "SYSTEM AND METHOD FOR MUSIC SCORE CAPTURE AND SYNCHRONIZED AUDIO PERFORMANCE WITH SYNCHRONIZED PRESENTATION" to Robert D. Taub filed Dec. 15, 2005, which is incorporated herein by reference for all purposes.

Collaboration Portal

Many aspects of the invention relate to the functionality and/or construction of the collaboration portal. In some embodiments, the collaboration portal may be implemented as the portal 160 of FIG. 1. Various embodiments of the collaboration portal may provide functionality relating to file management, music viewing, music editing, virtual conferencing, session recording, and other facets of collaborative music handling. It will be appreciated that many possibilities are available regarding graphical user interface ("GUI") design and implementation, levels of user interaction allowed by the collaboration portal, types of GUI controls, functional crossover and dependence between modules and components, network design and interface, file management, and other aspects of the collaboration portal. As such, the description below is intended to describe only some exemplary embodiments of the invention, and those of skill in the art will appreciate that the scope of the invention is not limited by the specific embodiments disclosed.

Figure 7:
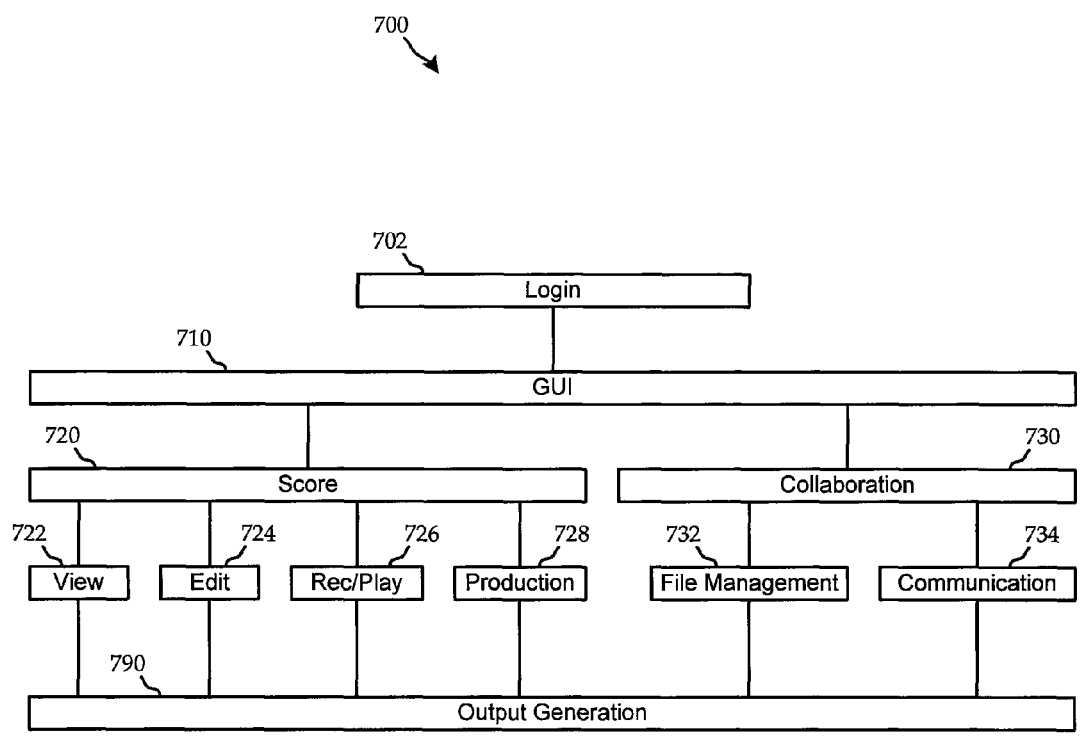
FIG. 7 shows one exemplary configuration of various modules that may be incorporated within an embodiment of a collaboration portal according to the invention.

FIG. 7 shows one exemplary configuration of various modules that may be incorporated within an embodiment of a collaboration portal 700 according to the invention. In some embodiments, the collaboration portal 700 includes three primary layers: a login layer 702, a GUI layer 710, and an output generation layer 790. It will be appreciated that division into these layers is intended only to clarify discussion of the various functions of the collaboration portal 700, and may or may not affect actual implementations of the collaboration portal 700.

The login layer 702 may be operable to control various meta-GUI aspects of the collaboration portal 700. Some embodiments of the login layer 702 are implemented as the network interface unit 150 of FIG. 1. In some embodiments, the login layer 702 is operable to control network routing and permissions. It may be desirable to protect or manage GUI or collaboration project elements for various reasons. For example, say a server stores data relating to many different collaboration projects for many different collaborators. Collaborators may want to restrict access to their collaboration files, for example, to protect data from undesirable edits or deletions, to protect data from undesirable viewing or copying, to see who is using the files and when they are being used, and for other reasons.

In some embodiments, the login layer 702 is operable to receive login information with which it may determine user access privileges. Users may or may not have restricted access to the entire collaboration portal 700 (e.g., the collaboration portal 700 may operate as a subscription service), to certain areas of the collaboration portal 700 (e.g., there may be a tiered pricing structure allowing access to different functions for different prices, different levels of users may have access to different functions, different types of collaborative projects may be associated with different types of functions, etc.), to certain files (e.g., a user may only have access to files associated with a given collaboration project, the user may only have access to files the user uploaded or contributed, the user may have different types of access (e.g., read, write, edit, delete, comment, etc.) to different files in a project, etc.), or to other information (e.g., to collaborator information, to certain file management functions, to certain publishing and/or sharing functions, etc.).

In other embodiments, the login layer 702 is operable to receive login or other information to determine characteristics of the user, other than access privileges. For example, certain configuration or preference information may be associated with a given user, user workstation, user category, etc. For example, for a given collaboration project, one set of users may be "owners" of the collaboration project (e.g., with full rights to all aspects of the related files), a second set of users may be "collaborators" (e.g., with access to certain collaboration and editing capabilities), a third set of users may be "contributors" (e.g., with edit rights only to the files they contribute), a fourth set of users may be "fans" (e.g., with no edit rights to any of the files, but access to listen to published output files), and a fifth set of users may have no access at all. In another embodiment, the login information is used to configure preferences of the collaboration portal 700 to match a profile relating to the user. For example, novice users and expert users may be provided with different feature sets and menus.

In yet other embodiments, the login layer 702 is operable to receive login or other information relating to the abilities or preferences of certain users, including those with no access to particular collaboration projects. In one embodiment, users submit information to the portal relating to which instruments they know how to play, their skill level, their influences, etc. This may help bands and others find people with whom to connect to receive music contributions or certain types of feedback. In another embodiment, users submit information to the portal relating to their listening preferences. Bands, producers, other users, and other people and entities may then use that information to direct or suggest potentially desirable content to those users to meet their preferences.

In still other embodiments, the login layer 702 may control various network traffic and/or file management functions. For example, it may be desirable to route or control the flow of network traffic and/or file uploads and downloads based on various network characteristics (e.g., the geographic location of the user's workstation, the number of users logged in to the collaboration portal 700 or into the specific collaboration project, the amount of data being transferred at a given time, the types of data being transferred, the types of encryption being used, etc. In certain embodiments, the login layer 702 is operable to collect certain types of network information and use the information to perform the functions above.

In one exemplary use of the collaboration portal 700, a user may initiate a collaboration project. The user may begin by setting up preferences relating to the project. For example, the user may set access privileges, file handling preferences, music creation preferences, score representation privileges, etc. The user may also upload at least one music contribution to begin creation of the collaboration project. In another exemplary use of the collaboration portal 700, a user may log into the collaboration portal 700 to access an existing collaboration project. The user may then upload additional music contributions to the project, edit existing information relating to the collaboration project, or otherwise interact with the collaboration project.

The GUI layer 710 is operable to control various user interface functions according to embodiments of the invention. Purely for clarity of description, some functions of the GUI layer 710 may be described with respect to two sub-layers: a score layer 720 and a collaboration layer 730. It will be appreciated that embodiments of the collaboration portal 700 may or may not be implements using these layers.

The score layer 720 as described herein may handle any or all of the music-related aspects of the collaboration portal 700, including view 722, edit 724, record and playback 726, and production 728 functionalities. Any or all of these various functions may handle audio and related data in a number of different ways. For example, a user may interact with the audio data at the signal level, at the score representation level, or in any other way. Further, various functions may or may not be available to a user depending on the type of data representation being used. For example, it may be desirable to provide note editing capabilities only in a score representation mode of the collaboration portal 700, while signal processing functions may only be provided in a signal representation mode of the collaboration portal 700.

Figure 8A:
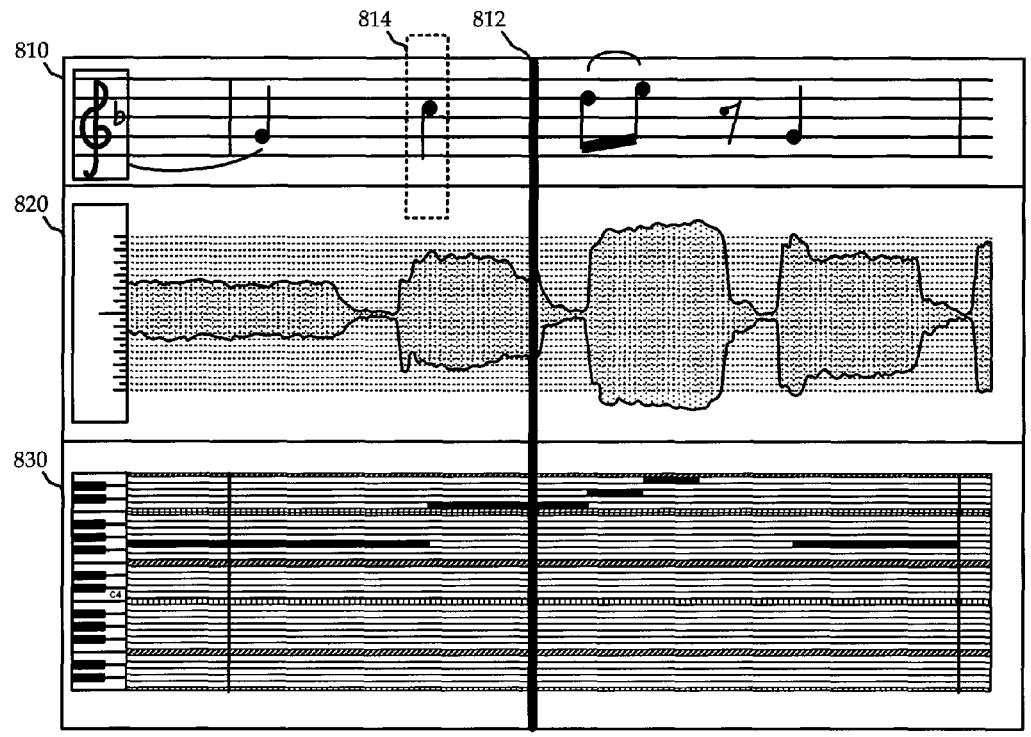
FIG. 8A shows an illustrative embodiment of viewing functionality that includes three aligned views of a portion of a collaboration project.
Figure 8B:
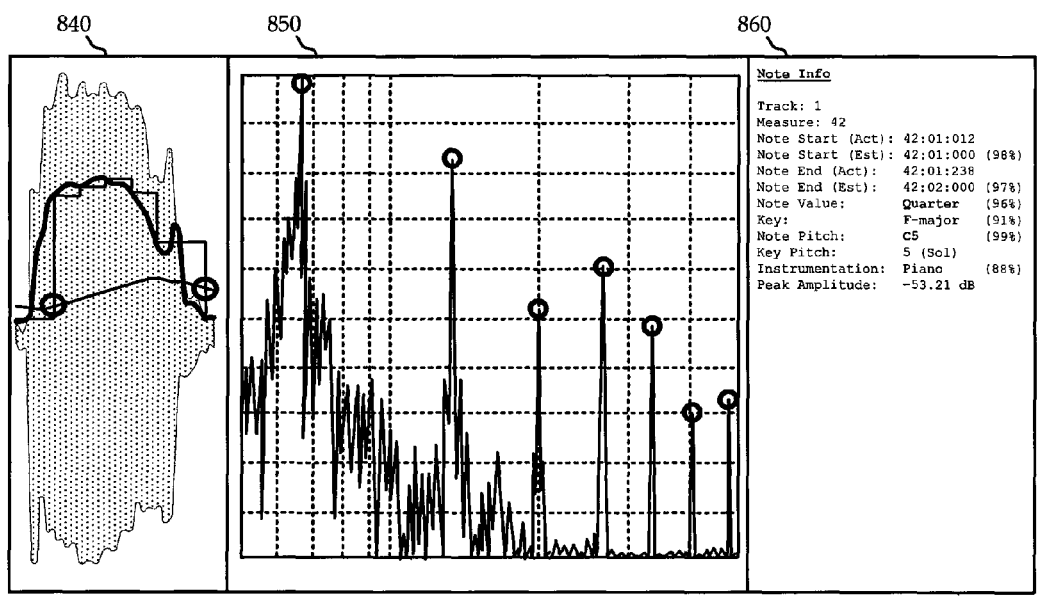
FIG. 8B shows an illustrative embodiment of a zoomed-in view of the viewing functionality shown in FIG. 8A, focused on a particular note.

Of course, the collaboration portal 700 may also be operable to operate simultaneously in multiple representation modes. In some embodiments, the view functionality 722 may be operable to provide multiple views, as shown in FIGS. 8A and 8B. FIG. 8A shows an illustrative embodiment of view functionality 722 that includes three aligned views of a portion of a collaboration project. FIG. 8B shows an illustrative embodiment of a zoomed-in view of the view functionality 722 shown in FIG. 8A, focused on a particular note.

Turning first to FIG. 8A, a score representation view 810, a signal representation view 820, and a piano roll representation view 830 are shown. The time scales of the views may be aligned. In some embodiments, the various views may be operable to scroll with the progression of playback or recording. In certain embodiments, as playback or recording progresses, certain elements may remain in place to enhance the viewing experience. For example, while the views scroll, a current playback location bar 812 may remain in a location (e.g., the center) of the view window to represent what data is currently being played or received. In another example, while views scroll, clefs, key signatures, track titles, meters, and other elements may remain in a location (e.g., the left) of the viewing window.

The score representation view 810 may provide information relating to score (e.g., sheet music) elements, including notes, staves, clefs, measure numbers, lyrics, key signatures, etc. It may be desirable to provide certain editing capabilities relating to any or all of the displayed (or displayable) music elements in the score representation view 810. For example, notes may be added, deleted, or moved; sections of notes may be transposed, quantized (e.g., to the nearest eighth note), etc.; stem directions may be toggled; expression markings may be added or modified (e.g., staccato dots, slurs, accents, etc.); clefs, key signatures, time signatures, and other information may be modified, lyrics may be added, modified, aligned, etc.; repeats, measure bars, and other measure handling may be added; etc.

The signal representation view 820 may provide information relating to one or more audio signals, including amplitudes, envelopes, etc. It may be desirable to provide certain editing capabilities relating to any or all of the displayed (or displayable) signal elements in the signal representation view 820. For example, signals may be cleaned up (e.g., by using filters, or by comparing the signal to other signal data); envelopes may be generated; note onsets and other music element information may be deconstructed (e.g., re-deconstructed with a different resolution or using more information from other music contributions); signals may be normalized (e.g., to avoid differences in average or peak volume between multiple music contributions, or to avoid clipping); portions may be re-sampled (e.g., at a different sampling rate); harmonic effects may be added (e.g., distortion, filtering, reverb, etc.); envelope and related effects may be added (e.g., panning, fade-in or fade-out, etc.); sections of the signal may be cut, pasted, copied, etc.; etc.

The piano roll representation view 830 may provide similar or different information provided in the score representation view 810, but may be represented differently for various reasons. For example, a user may not understand how to read sheet music, making the score representation view 810 a potentially undesirable representational scheme for that user. In another example, a user may want to nudge a note over slightly to subtly affect expressive playback of a note, but not enough to affect the location of the note on a score. As shown, the piano roll representation view 830 shows note pitches relative to a piano keyboard, and a bar-graph-like representation of note durations over time. Other information may also be provided, for example including measure bars.

It will be appreciated that many other view functions may be provided. In one embodiment, each view is presented in a selectable window which may be aligned with some or all of the other windows (as shown) or may be displayed independently (e.g., may be maximized to a larger portion of a display). In various embodiments, menus and control may be provided for enhancing the user interface experience. For example, clickable icons may be provided to allow a user to perform the various functions related to a particular representation (e.g., in the score representation view 810, an "add note" icon may be provided). In another example, the controls may change depending on the active representation or other actions of a user. For example, if a user selects a portion of the audio signal in the signal representation view 820 (e.g, by clicking and dragging with a mouse), a "extract note onset over selection" icon may appear (or become selectable). In still other embodiments, different menus and options may be provided to the user when the user left-clicks, right-clicks, double-clicks, or otherwise selects notes or other music elements in the different representational views.

In some embodiments, zoom functionality may be provided. For example, it may be desirable to zoom into the signal representation view 820 to be able to more clearly see aspects of the audio signal. When multiple windows are being displayed in alignment, the windows may all zoom together to maintain the alignment. The user may be able to zoom, for example, by selecting a zoom window (e.g., a section of a signal in the signal representation view 820), or by selecting a particular music element. In various embodiments, the "zoomed in" view may provide additional information and may or may not be in separate windows or frames.

For example, by selecting a particular note, a user may be provided with additional views specific to that note. FIG. 8B shows an embodiment of this scenario. A user selects a note 814 in the score representation view 810 of FIG. 8A. Three new representational views are provided to the user: a note envelope view 840, a note timbre view 850, and a note information view 860.

In the note envelope view 840, the portion of the audio signal relating to the note may be provided. Other information, including derived envelopes, envelope crossings, etc. may also be provided. In the note timbre view 850, the harmonic composition of the portion of the audio signal relating to the note may be provided. Other information, including identified frequencies with high confidence, confidence values, peak locations and amplitudes, fundamental frequency identification, overtone series, overlaid instrument timbre maps (e.g., the harmonic composition for a modeled grand piano), nose floor thresholds, etc. may also be provided. In the note information view 860, various types of textual information relating to the selected note may be provided. For example, information may be provided relating to the note's representational music location (e.g., track, staff, measure, start timestamp, end timestamp, duration, etc.); extracted information (e.g., extracted note onset and note end times, peak amplitude, ADSR envelope information, etc.); quantized or otherwise calibrated information (e.g., rounded start and end times, predicted note values, predicted pitch, predicted key, predicted instrumentation or track, etc.); confidence values relating to various information (e.g., a determination that the note is a quarter note may be made only with 96% confidence, etc.); etc.

Returning to FIG. 7, other functions of the score layer 720 of the collaboration portal 700 relate to the edit functionality 724. The edit functionality 724 may relate to the signal level of a music contribution, to music elements of a music contribution, to shared elements or features across multiple music contributions or for the collaboration project as a whole, or to any other useful aspect of the collaboration project. In some embodiments, the edit functionality 724 directly affects the music elements of a collaboration project (e.g., the notes, tempos, dynamics, etc.). In other embodiments, the edit functionality 724 affects the playback of the music elements (e.g., with expressive subtleties, effects, instrumentation, etc.). In still other embodiments, the edit functionality 724 affects the display of the music elements (e.g., a "swinging" eighth note may be displayed as an eighth note, even though it is played with syncopation).

Some aspects of the edit functionality 724 relate to audio and score deconstruction. Embodiments of audio and score deconstruction are discussed more fully above. In some embodiments of the collaboration portal 700, music contributions are received at various levels of deconstruction. Music contributions which have not been deconstructed at all may be deconstructed when they are uploaded to the collaboration portal 700 or added to the collaboration project. In some cases, music contributions (or portions thereof) may be added to collaboration projects without any deconstruction.

In certain embodiments, music contributions that have not been previously deconstructed (or have been previously deconstructed at a particular level) may be deconstructed when needed. For example, a bass line may be added to a collaboration project to experiment with an idea, and may be kept as an audio recording with no deconstruction into music elements. At a later date, collaborators may wish to further experiment with components of the bass line. As such, they may wish to deconstruct the rhythm (e.g., to re-align another track to the rhythm of the bass line or to change the tempo), to deconstruct the note pitches or intervals (e.g., so the selection may be transposed to a different key or so the instrumentation may be changed), etc.

It will be appreciated that, while certain functions may be performed at the signal level, the music element level may provide more or improved functionality. For example, it may be impractical to determine key or meter from the signal without first extracting certain music elements at the note level. In another example, it may be possible to slow the tempo of a passage at the signal level (e.g., by intelligent interpolation of samples into the digital audio signal), but undesirable artifacts may be added (e.g., there may be aliasing, or certain types of distortion or reverberation may sound strange deconstructed when time-expanded). The result may be improved by changing tempo after deconstructing music elements (e.g., note effects may remain tied to a note, without affecting the effect itself).

Other functions of the score layer 720 of the collaboration portal 700 relate to record and playback functionality 726. Some embodiments provide traditional types of record and audio playback functionality 726 provided by non-collaborative music creation and handling environments. Other embodiments, however, exploit the collaborative nature of the collaboration portal 700 to provide additional functionality.

In various embodiments, music contributions may be added to a collaboration project in various ways, including by uploading, adding from a database, or recording directly into the project. In one embodiment, a contributor records a music contribution into the collaboration project by performing along with other portions of the project. For example, a contributor may play a portion of the collaboration project while simultaneously recording vocals over the playback. In another embodiment, music contributions are added in more advanced ways. For example, a contributor may upload an audio sample (e.g., a recording of a marble dropping into a crystal drinking glass) and direct the collaboration portal 700 to add the sample to the first beat of every third measure.

In some embodiments, a music contribution may be recorded to provide particular data. For example, a user may record a metronome track (e.g., to aid in recording other tracks or to aid in tempo and meter determinations), a set of basic root-position chords (e.g., to aid in key determinations), a set of vocal syllables (e.g., to act as a vocoder filter to be applied to a guitar track), etc. In certain embodiments, provided audio information may be deconstructed substantially in real time, at particular intervals, on request of a user, or at any other useful time.

Playback functions of the record and playback functionality 726 may also be implemented in various ways to exploit the collaborative nature of the collaboration portal 700. In one embodiment, a user may be able to play all or a portion of a particular track in a collaboration project. In another embodiment, a user may be able to play an entire collaboration project with all its component tracks and music contributions. In yet another embodiment, a user may be able to play all music contributions meeting a particular characteristic (e.g., from a particular contributor or set of contributors, added or modified during a particular timeframe, placed up for consideration by a collaborator, etc.). In still other embodiments, a user may be able to jump to a particular portion of the collaboration project which has been recently modified, toggle between various proposed contributions to a particular section, or perform any other useful playback functions.

It will be appreciated that many other playback and record functions may also be provided according to the invention. For example, music contributions may be played while they are being loaded (e.g., they may be streamed). In another example, audio may be processed or deconstructed while it is being uploaded, recorded, played back, etc.

Other functions of the score layer 720 of the collaboration portal 700 relate to production functionality 728. In some cases, collaborators may wish to format collaboration data or add collaboration data relating to various types of production. In one embodiment, the collaboration portal 700 includes lyric handling functions. For example, lyric handling functions may include adding and editing lyrics; aligning lyrics with notes or other music elements; and formatting lyric displays (e.g., font, size, handling of syllables or words which span multiple notes, etc.).

In another embodiment, the production functionality 728 includes handling of non-musical (or indirectly musical)

score representation information. For example, the collaboration portal 700 may allow users to add measure numbers; track titles; score titles; page headers, footers, and margins; expression and dynamic markings; score symbology (e.g., signas, codas, etc.); instrument-specific markings (e.g., tablature grids, bow or strum directions, etc.); textual information (e.g., performance directions, copyright information, etc.); or any other data which may be useful to a performer or other party.

Still other embodiments of production functionality 728 may include audio, rather than score, production features. For example, the collaboration portal 700 may provide capabilities relating to sampling (e.g., for changing the sample rates); flattening (e.g., for removing track-specific or contributor-specific data); encoding (e.g., for a specific codec or media player); etc. Other information may be provided for or by the output generation layer 790 of the collaboration portal 700.

In various embodiments of the collaboration portal 700, functions relating to a collaboration layer 730 are provided. In some embodiments, the collaboration layer 730 includes file management functionality 732 and conferencing functionality 734.

Figure 9:
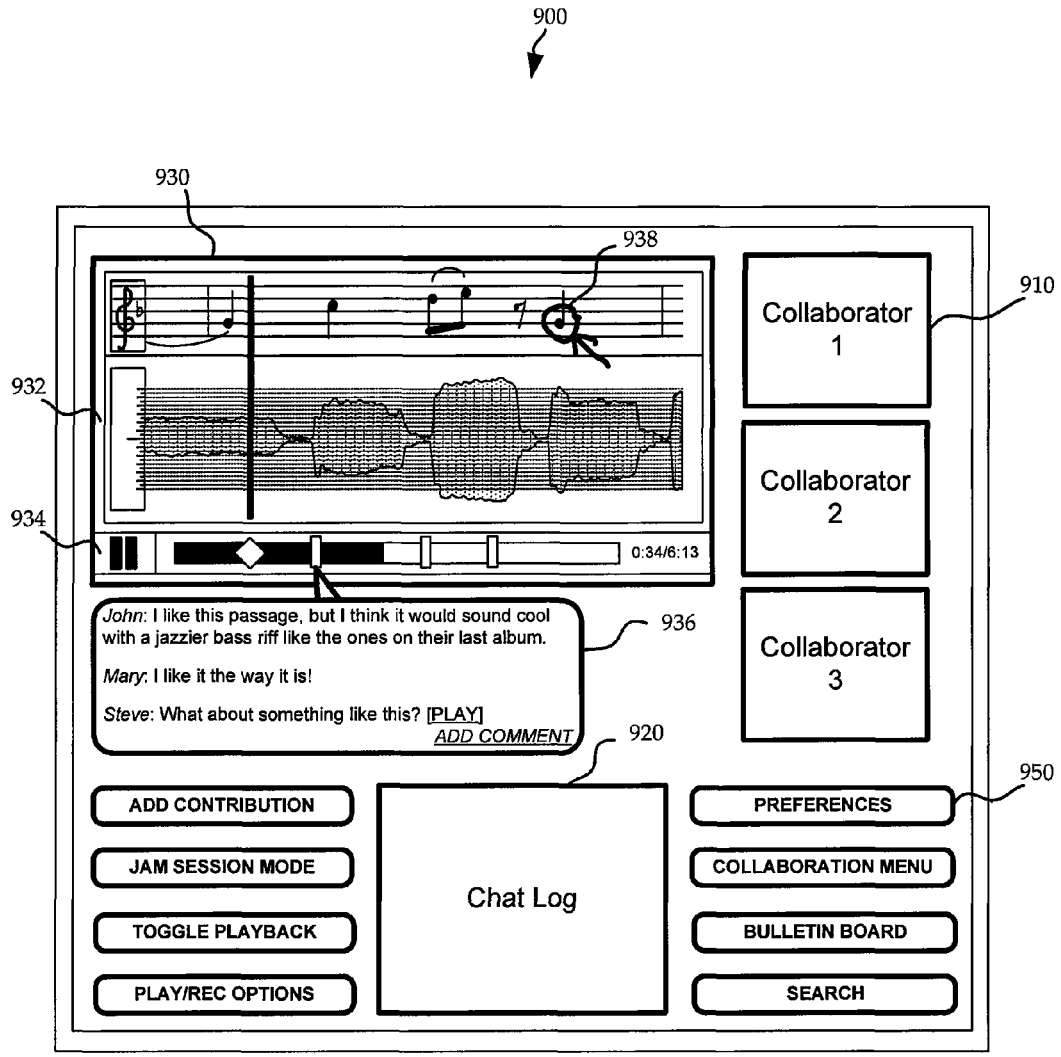
FIG. 9 shows an embodiment of a GUI for a collaboration portal according to the invention.

FIG. 9 shows an embodiment of a GUI 900 for a collaboration portal 700 according to the invention that illustrates various collaboration layer 730 functions. Some functions of the GUI 900 may relate to file management functionality 732, while other functions of the GUI 900 may relate to conferencing functionality 734.

The GUI 900 provides a number of aspects, each providing various types and levels of functionality, including a videoconferencing area 910, a chat area 920, a music area 930, and a number of buttons 950. The videoconferencing area 910 provides features useful for videoconferencing. For example, a video window may be provided for each collaborator online at the time of the video conference so the collaborators may all have a virtual "live" collaboration session. It will be appreciated that various audio and video features may be included to enhance the videoconferencing area 910 and capabilities according to the invention. For example, audio and video controls (e.g., volume, resolution, etc.), "call" controls (e.g., join conference, invite, hang up, transfer, etc.), and caller control options (e.g., pass screen control to a particular attendee of the conference, etc.) may be provided.

In various embodiments, the chat area 920 may include various features useful for textual conferencing or for logging. In one embodiment, the chat area 920 simply acts as a virtual notepad, recording textual information entered by participants in a conference session. In other embodiments, the chat area 920 is operable to record and/or display video, audio, and other data. For example, a contributor may play a riff and attach it to the chat area 920 with the text: "What do you guys think of this?" In still other embodiments, the chat area 920 may act as a virtual whiteboard, accepting freehand drawing and text (e.g., using a mouse as a pen). In yet other embodiments, the chat area 920 may be operable to translate information for enhanced logging or usability. For example, the chat area 920 may automatically transcribe dialog spoken during an audio or video conference, convert free-hand writing to editable text, or other similar functions.

The music area 930 may provide any functions useful for collaborative handling of the musical portions of the collaboration project. In one embodiment, various representational views may be displayed and/or captured in a representation frame 932 of the music area 930. For example, as shown, score and signal representations of a portion of the collaboration project may be displayed in the representation frame 932.

The music area 930 may also include a playback control frame 634. As shown, the playback control frame 634 may include any number of controls and indicators, including play controls (e.g., play, pause, stop, record, etc.), progress bars (e.g., progress indicators showing elapsed playback time, progress indicators for playback during loads (e.g., streaming playback), chapter or other indexing indicators, etc.), indicators for commenting (e.g., locations where a collaborator has entered a comment or flagged the location), and any other useful indicators or controls.

In some embodiments, the music area 930 provides enhanced functionalities. In one embodiment, collaborators may provide comments 936 to portions of the collaboration file. For example, say a band posts their collaboration file up on a fan website for fans to listen and comment. While listening to the project, a fan ("John") may add a comment 936 to the file, stating something, like "I like this passage, but I think it would sound cool with a jazzier bass riff like the ones on their last album." The comment 936 may then appear as part of the file for the collaborators or for other fans to see. Other fans may then post textual, video, audio, or other comments 936 in response to John's comment. For example, another fan ("Mary"), may post a response that states: "I like it the way it is!" Still another fan ("Steve") could post a response containing an audio clip of a new bass line he created that he thinks would fit perfectly with the song. In this way, the comment 936 could become a sort of blogging tool. As shown, during a videoconferencing session, the collaborators could pull up their collaboration project, with its associated comments 936, and discuss reactions to their project.

Another enhanced function of the music area 930 may be the ability to edit within the music area 930 in collaborative ways. In various embodiments, the collaborators have access to all the applicable functions of the collaboration portal 700 from within the music area 930. In other embodiments, further functionality is provided, like the ability to virtually "draw" on the music area 930. For example, during a videoconferencing session, a collaborator may wish to pause the playback of the collaboration project and point out a note that he does not like. Using the virtual drawing functionality, the collaborator may virtually draw a circle around the note and even an arrow pointing to the note 938. It will be appreciated that this and other similar information may be stored in a log of the conferencing session, in association with the collaboration project, temporarily during the session, or not at all, depending on certain preferences.

Embodiments of the GUI 900 may also provide any number of other controls. In some embodiments, a number of buttons 950 are provided for access to other certain functionality of the collaboration portal 700. It will be appreciated that access to portal functionality may be provided in many other ways according to the invention, including by using menus, other windows and modules, etc. By way of example, eight buttons 950 are shown in FIG. 9: "Add Contribution," "Jam Session Mode," "Toggle Playback," "Play/Record Options," "Preferences," "Collaboration Menu," "Bulletin Board," and "Search."

The "Add Contribution" button may allow users of the GUI 900 to add a music contribution to the collaboration project. During the add process, other options may also be provided (e.g., by providing other menus). For example, the music contribution may be added as a new track or to an existing track, or as one of a number of options for a section of the project; the audio may be processed during addition (e.g., by down-converting, deconstructing, etc.); or the audio may be synchronized or quantized to certain parameters (e.g., to a drum track).

The "Jam Session Mode" button may allow users to enter a virtual jam session. In this exemplary mode, participants may play all or part of the collaboration project while "jamming" (e.g., performing) together. Additional options may allow participants to, for example, loop sections of the collaboration project (e.g., to keep trying new ideas over the same passages or to practice a section of a song), to record all or part of the jam session (e.g., in real time), to auto-deconstruct all or part of the jam session (e.g., to create music elements, to generate a score, etc.), etc.

The "Toggle Playback" button may allow collaborators to toggle between multiple potential passages in a collaboration project. For example, say three different contributors (e.g., two fans and a band member) all submitted ideas for a vocal track. During playback of the collaboration project (e.g., during a videoconference), the collaborators may be able to toggle among the three submissions to decide which, if any, they like best.

Additional functionality may allow the collaborators to select passages they prefer. For example, some embodiments of the GUI 900 may provide collaborators with voting buttons that allow the collaborators to vote for a particular submission. Of course many additional controls, indicators, and functions are possible to support or enhance this capability. For example, the collaboration portal 700 may be operable to keep track of the votes, generate statistics, determine a winner, allow for voting by other parties (e.g., fans), etc.

The "Play/Record Options" button may provide access to any number of play and record options. For example, selecting the button may cause a menu to be displayed in the GUI 900 with options to select which tracks to play, whether to lock down certain tracks to prevent further editing, etc. Some of the other play and record functions which may be available are discussed further above.

The "Preferences" button may provide a user with access to any number of preferences. In some embodiment, many preferences are available for configuring the GUI 900. For example, a user may select the sizes, availabilities, and functions of the different frames, areas, controls, and indicators provided by the GUI 900. In other embodiments, preferences are available for configuring conferencing, user profiles, and any other feature of the collaboration portal 700.

The "Collaboration Menu," button may provide options relating to collaboration. For example, the menu may provide conferencing options (e.g., start conference, end conference, invite attendee, block attendee, display attendee information, etc.), security settings (e.g., relating to digital rights management, encryption, file access, etc.), change user status (e.g., give specific permissions to specific users), publication options (e.g., enter publication mode, publish collaboration project to fan site, burn demo track, etc.), etc.

Other features of a collaboration menu may relate to file management. Music contributions and other files relating to a collaboration project may come from different sources, be stores in different locations, be stored in different formats, contain different types of information, have different security settings, etc. As such, many functions of the collaboration portal 700 may relate to allowing certain users to handle file management. Additionally, it may be desirable in a collaborative environment, to provide functionality relating to change management. For example, collaborators may wish to be able to lock down files to prevent further changes, to limit changes to certain users, to record previous versions of a file (e.g., in some cases limited to some number of versions, for some amount of time, etc.), and to have other types of control over changes to the collaboration project.

The "Bulletin Board" button may provide access to a virtual bulletin board, where users may post different types of items. For example, fans may post general statements about the band (e.g., about the music direction, latest concert tour, latest album, members, etc.), audition tapes and music contributions, etc.; the collaborators may post questions to fans, flyers for upcoming shows, responses to fan comments, etc.; and any other useful information.

The "Search" button may provide access to various search functions, including music-based search functions. In one embodiment, collaborators may search for musicians with certain characteristics (e.g., from a geographic area, with certain training, with certain influences, etc.) as potential future contributors to or members of their band, group, orchestra, etc. In another embodiment, musicians may wish to search for music "clip art." For example, a musician may wish to browse through a library of melodic lines written in 7/8 meter to get inspiration for part of a collaboration project. The library may, for example, be automatically generated from a database of deconstructed audio files, contributed as an open music-sharing database, posted to a database for sale, etc. In yet another embodiment, musicians may wish to search for similar passages to ones they wrote to avoid or detect potential copyright infringement or other unauthorized use of compositional works. Embodiments of music-based searching functionality are provided in U.S. patent application Ser. No. 12/031,654, entitled "MUSIC-BASED SEARCH ENGINE" to Robert D. Taub, et al., which is filed Feb. 14, 2008, and incorporated herein by reference for all purposes.

While the description above has focused primarily on usage of the GUI 900 by bands and groups of musicians, it will be appreciated that many other types of users are possible. In one embodiment, producers and engineers can use the collaboration portal 700 to collaborate on final music outputs. In another embodiment, marketing personnel, disc jockeys, and other people may collaborate with a band and/or others to comment on, help finalize, or preview music. In yet another embodiment, musicians may use the collaboration portal to learn music. For example, a group may be able to practice together within the GUI 900, or a new or potential member of a band may be able to play through songs to practice or audition.

In one exemplary usage of the collaboration portal 700, a student may wish to meet with his piano teacher over the internet to get help with a difficult passage. The score may be displayed in the music area 930, and the student and teacher may begin a videoconference in the videoconferencing area 910. As the student plays, the teacher may be able to point out mistakes or areas of improvement using various features of the GUI 900. Alternately, the teacher may be able to play portions of the piece for the student to hear.

In another exemplary usage of the collaboration portal 700, a student may wish to practice a piano piece. The score may be displayed in the music area 930, and the student may enter a practice mode. As the student plays, his music input may be automatically deconstructed into music elements (e.g., at least to a level necessary for display as a score representation). A score representation of the student's performance may also be displayed in the music area 930. For example, as the student plays, he may see the score representation of his performance being overlaid on the original score in the music area 930 (e.g., in a different color). The student may then be able to clearly see where there are mistakes in his performance (e.g., in note pitch and/or duration). Further functionality may help the student identify areas of improvement, areas needing additional practice, skills needing additional practice, scores and tracking to show improvement over time, practice logs and records for use by the student's teacher, and any other useful information. For example, the collaboration portal 700 may identify that the student plays incorrect notes whenever large jumps appear in the music. The collaboration portal 700 may then either generate or identify a set of exercises (or other pieces) to help the student practice that skill.

During or after the creation of a collaboration project, it will be appreciated that many types of output of many different types of data are possible. As shown in FIG. 7, other functionality of the collaboration portal 700 may relate to output generation. In some embodiments, the output generation is handled by an output generation unit, like the output generation unit 140 shown in FIG. 1.

In various embodiments, output from the collaboration project is used to generate score-representational output. In one embodiment, music elements deconstructed from audio or score input, or otherwise received, are processed to automatically generate a music score representation. Conventional software packages and libraries may be available for producing sheet music from the music score representation. Many such tools accept input in the form of a representation of the composition in a predetermined format, such as the MIDI or the like. Therefore, some embodiments of the system generate a music score representation that is substantially in compliance with the MIDI standard to ensure compatibility with such conventional tools. Once the music score representation is created, the potential applications are many-fold. In various embodiments, the score is either displayed on a device display, printed out, imported into music publishing programs, stored, or shared with others (e.g., for another collaborative music project).

In other embodiments, output from the collaboration project is used to generate audio-representational output. In one embodiment, the audio-representational output is compatible with an audio storage and/or playback device. For example, the audio-representational output may be compatible with burning to an audio compact disc, to an MP3 file, or to any other proprietary or non-proprietary format. In another embodiment, the audio-representational output may be configured for use by an audio signal processing system. In yet other embodiments, the audio-representational output may be operable to be directly or indirectly played through audio playback components (e.g., digital home audio components, speakers, sound cards, etc.).

Other embodiments of output generation, the representational output from the collaboration portal 700 is configured to be stored for later use or sent to another system In one embodiment, output data is sent over the network to a client workstation for further processing. For example, a client workstation may be used to deconstruct audio output, to playback audio signal data, or to perform any of the other output functions of the collaborative portal 700.

Exemplary Implementations

The systems and methods described above may be implemented in a number of ways. One such implementation includes various electronic components. For example, units of the various systems may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 10:
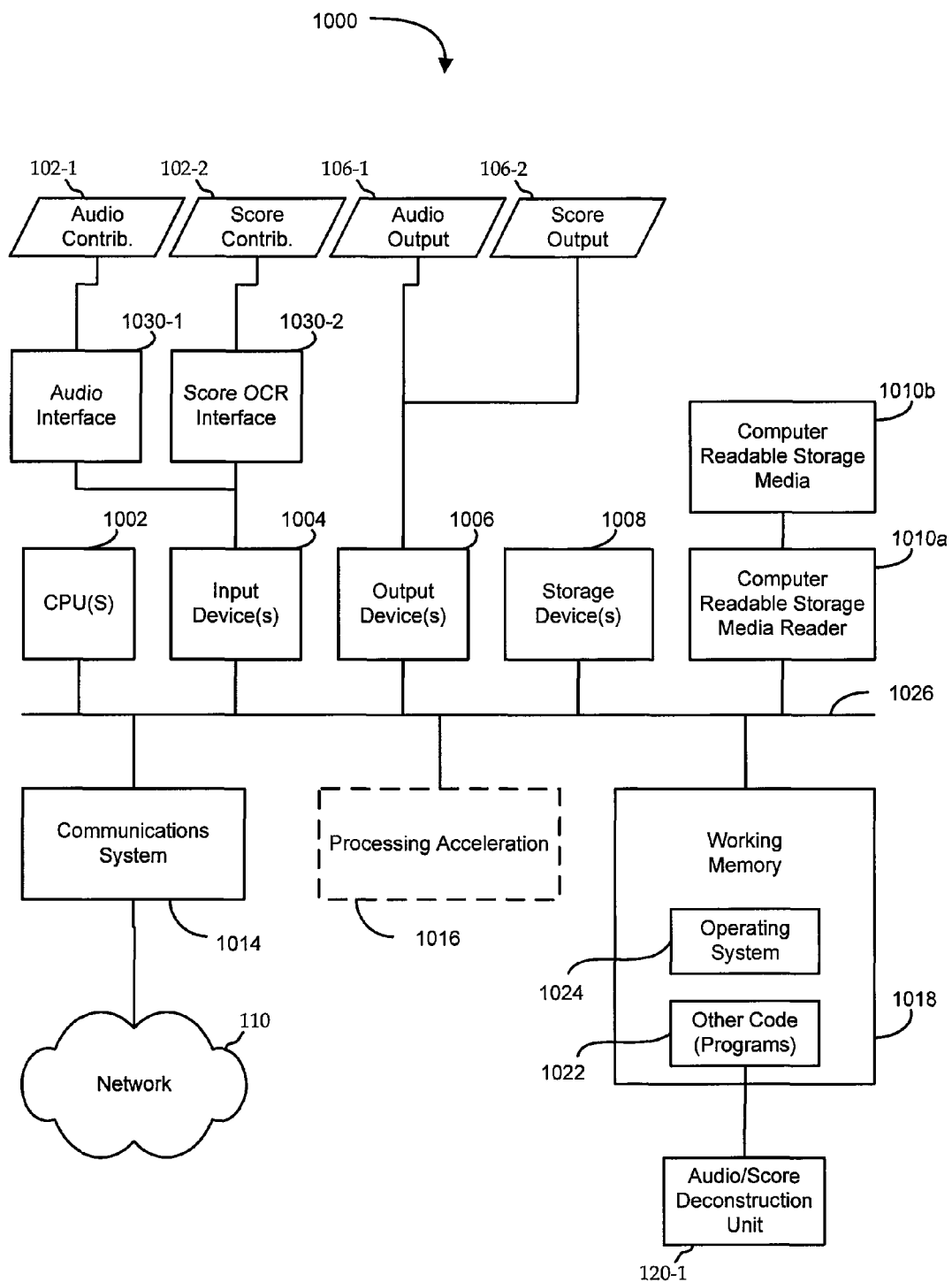
FIG. 10 provides a block diagram of a computational system for implementing certain embodiments of the invention.

FIG. 10 provides a block diagram of a computational system 1000 for implementing certain embodiments of the invention. In one embodiment, the computation system 1000 may function as the portal 160 shown in FIG. 1. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computational system 1000 is shown comprising hardware elements that can be electrically coupled via a bus 1026 (or may otherwise be in communication, as appropriate). The hardware elements can include one or more processors 1002, including without limitation one or more general-purpose processors and/or one or more special-purpose processors (such as digital signal processing chips, graphics acceleration chips, and/or the like); one or more input devices 1004, which can include, without limitation, a mouse, a keyboard, and/or the like; and one or more output devices 1006, which can include without limitation a display device, a printer, and/or the like.

The computational system 1000 may further include (and/or be in communication with) one or more storage devices 1008, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 1000 might also include a communications subsystem 1014, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 1014 may permit data to be exchanged with a network (such as the network described below, to name one example), and/or any other devices described herein. In many embodiments, the computational system 1000 will further comprise a working memory 1018, which can include a RAM or ROM device, as described above.

The computational system 1000 also may comprise software elements, shown as being currently located within the working memory 1018, including an operating system 1024 and/or other code, such as one or more application programs 1022, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). In one embodiment, the audio and/or score deconstruction units 120 of FIG. 1, and various other client-side methods are implemented as application programs 1022 readable by the computational system 1000.

A set of these instructions and/or code might be stored on a computer readable storage medium 1010*b*. In some embodiments, the computer readable storage medium 1010*b* is the storage device(s) 1008 described above. In other embodiments, the computer readable storage medium 1010*b* might be incorporated within a computer system. In still other embodiments, the computer readable storage medium 1010*b* might be separate from the computer system (i.e., a removable medium, such as a compact disc, etc.), and or provided in an installation package, such that the storage medium can be used to program a general purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.), then takes the form of executable code. In these embodiments, the computer readable storage medium 1010b may be read by a computer readable storage media reader 1010a.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In some embodiments, one or more of the input devices 1004 may be coupled with an audio interface 1030-1. The audio interface 1030-1 may be configured to receive a music contribution 102-1 by interfacing with a microphone, instrument, digital audio device, or other audio signal or file source, for example physically, optically, electromagnetically, etc. In other embodiments, one or more of the input devices 1004 may be coupled with a score interface 1030-2. The score interface 1030-2 may be configured to receive a score contribution 102-2 by interfacing with a camera, scanner, digital imaging device, or other digital image source.

Further, in some embodiments, one or more of the output devices 1006 may be coupled with an audio output device 106-1. The audio output device 106-1 may be configured to output audio signal data generated by embodiments of the invention to one or more systems or devices capable of handling that data, for example a speaker, audio component, digital-to-analog converter, compact disc writer, etc. In other embodiments, one or more of the output devices 1006 may be coupled with a score output device 106-2. The score output device 106-2 may be configured to output score representation data generated by embodiments of the invention to one or more systems or devices capable of handling that data, for example score transcription software, score publication systems, file storage devices, etc.

In one embodiment, the invention employs a computer system (such as the computational system 1000) to perform methods of the invention. According to a set of embodiments, some or all of the procedures of such methods are performed by the computational system 1000 in response to processor 1002 executing one or more sequences of one or more instructions (which might be incorporated into the operating system 1024 and/or other code, such as an application program 1022) contained in the working memory 1018. Such instructions may be read into the working memory 1018 from another machine-readable medium, such as one or more of the storage device(s) 1008 (or 1010). Merely by way of example, execution of the sequences of instructions contained in the working memory 1018 might cause the processor(s) 1002 to perform one or more procedures of the methods described herein.

The terms "machine readable medium" and "computer readable medium," as used herein, refer to any medium that participates in providing data that causes a machine to operate in a specific fashion. In an embodiment implemented using the computational system 1000, various machine-readable media might be involved in providing instructions/code to processor(s) 1002 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (1608 or 1010). Volatile media includes, without limitation, dynamic memory, such as the working memory 1018. Transmission media includes coaxial cables, copper wire, and fiber optics, including the wires that comprise the bus 1026, as well as the various components of the communication subsystem 1014 (and/or the media by which the communications subsystem 1014 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1002 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 1000. These signals, which might be in the form of electromagnetic signals, acoustic signals, optical signals, and/or the like, are all examples of carrier waves on which instructions can be encoded, in accordance with various embodiments of the invention.

The communications subsystem 1014 (and/or components thereof) generally will receive the signals, and the bus 1026 then might carry the signals (and/or the data, instructions, etc. carried by the signals) to the working memory 1018, from which the processor(s) 1002 retrieves and executes the instructions. The instructions received by the working memory 1018 may optionally be stored on a storage device 1008 either before or after execution by the processor(s) 1002.

It will be appreciated that many implementations of the system are possible according to the invention which may or may not incorporate the components or functionality described with respect to FIG. 10. In some embodiments, the system is implemented as a dedicated device. The device may include one or more internal microphones, configured to sense acoustic pressure and convert it into a music contribution for use by the system. Alternately, the device may include one or more music input ports for interfacing with external microphones, media devices, data stores, or other audio sources. In certain of these embodiments, the device may be a handheld or portable device. In other embodiments, the system\may be implemented in a multi-purpose or general purpose device (e.g., as software modules stored on a computer-readable medium for execution by a computer). In certain of these embodiments, the audio source may be a sound card, external microphone, or stored audio file. The input is then generated and provided to the system.

Other embodiments of the system may be implemented as a simplified or monaural version for operation as a music dictation device, which receives audio from users who play an instrument or sing a certain tune or melody or a part thereof into one microphone. In the single-microphone arrangement, the system subsequently translates the recorded music from the one microphone into the corresponding music score. This may provide a musical equivalent to text-to-speech software that translates spoken words and sentences into computer-readable text. As a sound-to-notes conversion, the tune or melody will be registered as if one instrument where playing.

It will be appreciated that different implementations of the system may also include different types of interfaces and functions relating to compatibility with users and other systems. For example, input ports may be provided for line-level inputs (e.g., from a stereo system or a guitar amplifier), microphone inputs, network inputs (e.g., from the Internet), or other digital audio components. Similarly, output ports may be provided for output to speakers, audio components, computers, and networks, etc. Further, in some implementations, the system may provide user inputs (e.g., physical or virtual keypads, sliders, knobs, switches, etc.) and/or user outputs (e.g., displays, speakers, etc.). For example, interface capabilities may be provided to allow a user to listen to recordings or to data extracted from the recordings by the system.

In one embodiment, the features of the invention are implemented in software, comprising an application that can be installed on a digital computer. The software implementation preferably provides input and output interfaces for the performer. That is, the host computer in which the software is installed typically includes a display for producing a visual presentation of a music score that the performer can read, to sing along or play the performer's musical instrument. The computer also typically includes an input interface, such as a microphone, for recording the performer's session, and includes an output interface, such as speakers, to enable the performer to listen to the recorded performance. The computer implementation can include image capture, wherein a music score comprising notes on a staff can be digitized via an optical input means and then entered into the computer. The digitized music score can be interpreted via OCR techniques, with the resulting interpreted data being processed so as to produce a synthesized audio rendition of the music score, including when appropriate a synthesized vocal rendition matching words with appropriate pitch, such that the audio rendition is synchronized with a visual presentation of the score. In the additional detailed descriptions provided below, the computer software implementation is referred to as a "Level X" implementation or is referred to as the "eMuse X" product (the name "eMuse" referring to a product embodiment from MuseAmi, Inc. of Princeton, N.J., USA, the assignee of all rights in the invention).

In another embodiment, the features of the invention are embodied in a handheld device that can include a display, an input interface, audio and visual output interfaces, and OCR image interpretation interfaces. The handheld device implementation includes a variety of convenient user control knobs and mechanisms for convenient navigation of the device functions. The display supports a visual presentation of menu options for selection of functions by the user.

As described further below, a computing device interprets and processes music score data by receiving the music score data from an external source and subsequently producing a synthesized audio rendition of the music score data and a synchronized visual presentation of music score.

The external source can consist of a network data source that provides the music score data to the computing device over a network connection. The network connection can consist of communication between the computing device and the network over a wireless connection.

The music score data can be read from a recorded medium by accepting the recorded medium into a reader of the computing device that then obtains the music score data from the recorded medium. The recorded medium contains sufficient data for synthesized audio rendition in accordance with a MIDI specification for synthesized music production. That is, the computing device can receive data that specifies a music score and can generate or synthesize corresponding musical tones in a selected tempo, timbre, clef, key signature, time signature, and the like. The recorded medium can comprise a flash memory device.

The computing device can be provided with ability for recording a user performance of a music score and providing playback of the recorded user performance. The user performance playback can occur independently of the synthesized music score rendition, or can occur simultaneously. In addition, the user performance playback can be provided along with a visual representation of the musical notes corresponding to the recorded user performance. In this way, a "music dictation" feature is provided.

In one alternative, the music score data used by the device to generate both the synthesized audio rendition and the synchronized visual presentation of the music score can be obtained by the device optically capturing a digital image of a music score, then interpreting and processing the digital information to produce a collection of data representing appropriate music notes, thus generating data that corresponds to the music score.

In addition, music contextual information can be provided that determines characteristics of the synthesized audio rendition of the music score data, all of which may be adjusted by the user. Such music contextual information can include multiple key signatures, time signatures timbre, tempo and expressive terms such as legato, crescendo, ritard, etc.

In another alternative, producing an audio playback of the music score data and a visual presentation of musical notes is effected through communication with a network data source. If desired, the network data source provides the music score data to the computing device. In yet another alternative, the network data source can provide to the computing device the music contextual information that determines music characteristics of the synthesized audio rendition of the music score data. Also, the network data source can provide the music context information over a wireless connection.

In one alternative, producing a synthesized audio rendition of the music score data and a synchronized visual presentation of music score is effected by inserting a recorded medium into a reader of the computing device. If desired, the computing device obtains the music score data from the recorded medium, and the recorded medium can also provide the music contextual information to the computing device for determining music characteristics of the synthesized audio rendition of the music score data.

One optional feature is to provide recording of the user's instrumental and/or vocal performance of the music score. Another alternative is to produce a synthesized audio rendition in accordance with a MIDI specification. In addition, producing the visual presentation can consist of displaying the music score synchronized with the corresponding synthesized audio rendition. Another option is to provide simultaneous synchronized playback, playback of both the visual presentation and audio rendition of the music score data and both the audio component of the recorded user performance and a synchronized corresponding visual display of the music score generated by the user performance.

In accordance with the invention, a computing device can optically digitally capture a music score and interpret the digital image, generating music score data for the computing device that corresponds to the digitally captured music score, and produce a synthesized audio rendition of the music score data and a synchronized visual presentation of music score. The computing device can receive music contextual information that is used by the computing device to determine music characteristics of the synthesized audio rendition of the music score data. Similarly to the alternative embodiment described above, the music contextual information can include multiple key signatures, time signatures timbre, tempo and expressive terms such as legato, crescendo, ritard, etc. that can be selected by the user to determine the music characteristics of the synthesized audio rendition of the music score data. As an option, the computing device identifies the music contextual information from the optically digitally captured music score, and optionally can obtain the music contextual information from a network data source. If desired, the network data source provides the music contextual information over a wireless connection with the computing device.

The computing device can be provided with its own loudspeakers for audio playback of synthesized renditions and/or performances recorded by the user. Additionally, the device can include an output jack for connection to headphones or external loudspeakers or the like, and can also be provided with wireless transmission capability that allows the device to transmit an audio performance to a wireless sound playback system (such as a home stereo system that has been enabled with wireless components). The device has sufficient computing memory to enable it to store musical passages of predetermined length.

The additional detailed descriptions below refer to various implementations of features in the handheld device implementation and are referred to as "Level 1" and "Level 2" or "eMuse 1" and "eMuse 2", respectively.

The following discussion describes music playback software that can be installed on a range of digital computing devices, and also describes embodiments of a handheld sheet music reading device, herein collectively referred to as the eMuse product.

Figure 11:
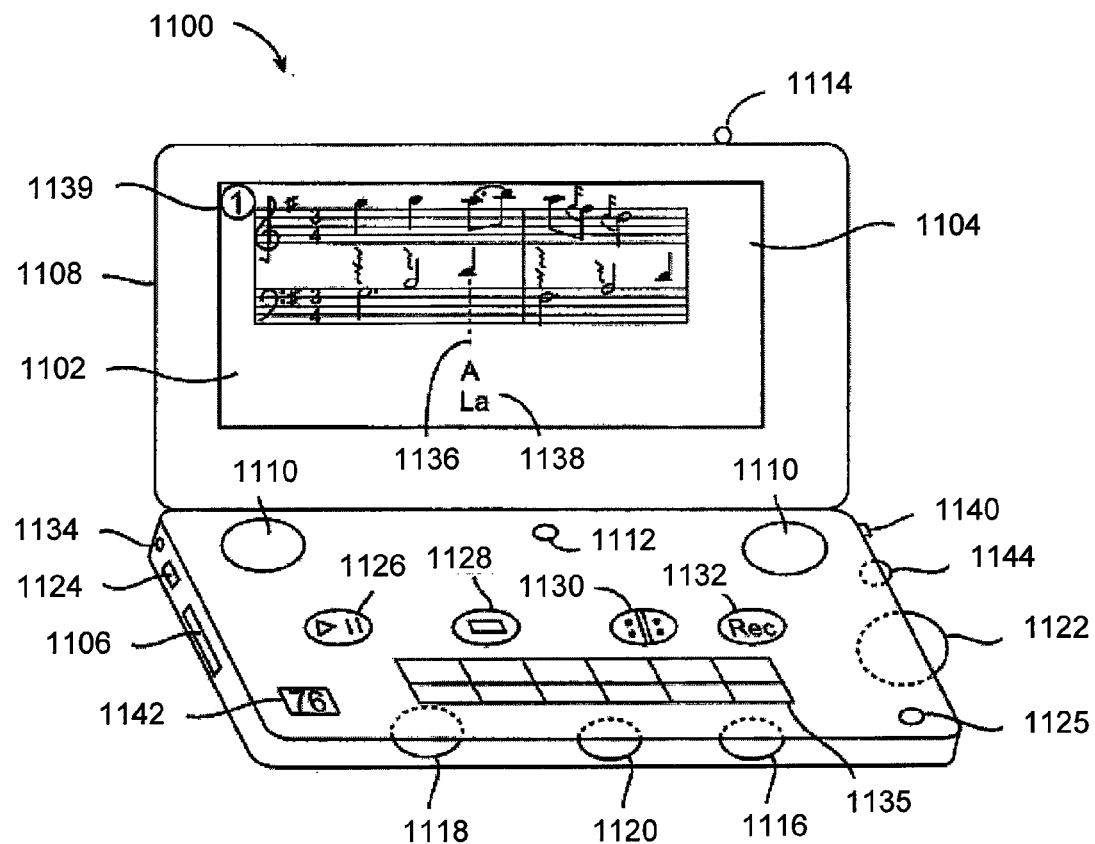
FIG. 11 shows an illustrative embodiment of a product according to the invention, as a hand-held consumer electronic device.

FIG. 11 shows an illustrative embodiment of a product as a hand-held, battery powered "point and shoot" consumer electronic device 1100 that captures an image of a selected musical passage—either a few measures or even an entire page—from sheet music, formats and encodes the passage digitally, then plays the selected passage, all virtually instantaneously in real time. The playback sound is instrument-specific, playing in a timbre (e.g., the sound of a piano, violin, flute, etc.) selected by the user. Multiple timbres can be played simultaneously. The device 1100 is designed to recognize music variables, such as key signature, meter, volume, and tempo, and account for music prose terms, such as forte, piano, cress., legato, and the like. An LCD screen 1102 displays the music passage 1104 as the device is playing it back, with each played note highlighted in a unique color so as to distinguish it from the rest of the music score.

The FIG. 11 device 1100 incorporates a digital "music card" feature, which supports insertion of a data card (not illustrated) that is encoded with one or more recorded or downloaded music pieces, and allows for quick reference to specific measures. The data card can comprise recordable media such as typically used by cellular telephones and digital cameras. The data card is received into a card slot 1106 of the device 1100. The device 1100 also works with digital data representing encoded music pieces. Downloaded files can also be saved within memory of the device. The encoded music pieces provide an enriched listening experience, allowing for quick reference to specific measures of the music score.

A record/playback feature of the device 1100 allows the user to immediately evaluate a recorded performance with reference to the music score. That is, the device 1100 can record a user's performance of the music piece and play back the user's performance, along with (or simultaneous with) playback of the received music piece. The user performance playback can be presented with a corresponding visual presentation, providing a "music dictation" feature. Both a metronome and a music tone tuner capability are also incorporated into the device, and the device can be adjusted for a "music minus one" feature. In a multi-staff or multi-part piece of music, the "music minus one" feature allows the user to determine which part(s) of the piece will be played back by the MIDI interface. This allows the user to play/sing a specific part along with the device.

FIG. 11 shows the device 1100 as a hand-held device with a flip-top 1108 having the LCD screen 1102 incorporated in the underside of the lid or top 1108. The device also incorporates a speaker 1110 for music playback (a stereo pair are illustrated in FIG. 11) and a microphone 1112 for recording a user performance. Image capture capability can be implemented as shown in FIG. 11, wherein the flip-top 1108 includes a camera system comprising an optical lens mounted in the outside surface of the flip-top 1108 and triggered by a lens shutter button 1114 for purposes of image capture. Various user interface controls are provided, shown as thumbwheels for adjusting volume 1116, playback tempo 1118, menu navigation 1120, and position 1122. The device 1100 can be provided with a USB port 1124, for more easily connecting with a network or other devices. An on/off switch 1125 turns the device 1100 on and off.

Control buttons are also provided for controlling, as illustrated in FIG. 11, functions involving renditions of the music score (synthesized performance) and playback of the user's performance. FIG. 11 shows exemplary control buttons for the functions of play/pause 1126, stop 1128, next/reset 1130, and record 1132. FIG. 11 also shows a metronome readout display 1134 that shows a timing indicator and is correlated with the playback tempo 1118. Selection of the metronome function, and the other features of the device 1100, is accomplished with menu navigation of the LCD screen 1102 in conjunction with operation of the menu thumbwheel 1120 and/or the position thumbwheel 1122. Selection can be achieved through operation of the next/reset control button 1130. A keyboard or keypad 1135 can be used for input via dedicated function keys of the keypad 1135 or alphanumeric input from the keypad 1135. On the LCD screen 1102, graphical images of music notes from the music passage 1104 are provided, moving across the screen, with individual notes appearing on-screen or being highlighted in the display as the notes are played. The display preferably provides a music staff image that is extended during playback so a predetermined number of notes or measures of music are displayed as the music passage 1104 is played.

In one embodiment of the device 1100, a digital camera system 1114 captures an image of a passage (a single note, several measures, or even an entire page) within a music score. The digital camera can be built into the device 1100 and can comprise a lens and image transducer combination that will be familiar to those skilled in the art. The LCD screen 1102 allows the user to determine exactly which measures are captured. The device can read a single stave music line, duets, trios, quartets, or even a full conductor's score. The device 1100 offers multiple simultaneous timbres.

The OCR module may receive the "photograph" of the music excerpt, comprising digitized image data. Important additional music contextual information, such as key signature and meter, is also sent to the OCR module, via a music score digital image or via a "cheat sheet" (e.g., downloaded from a website, then transmitted wirelessly or via the USB port to the device—see below) that lists all available key signatures and time signatures. The "cheat sheet" may also include a section from which the user can select the desired timbre(s), or the user can manually specify (input) the desired timbre(s).

In another embodiment, the device 1100 may provide MIDI synthesizer functionality. The OCR module may send the sound information to the MIDI module that produces synthesized sound. This offers adjustable timbre; the user specifies the type of instrument (piano, violin, flute, etc.) for the particular music passage or piece. The module also offers adjustable tempo so that the user can hear the passage slower (or faster) than the metronomic (if any) indicated in the score without any alteration of pitch. The device plays back through its own small loudspeaker, and also has a headphone jack 1134 and wireless capability for headphones and/or external speakers.

In various embodiments, the device 1100 may provide for certain visual display capabilities. For example, the LCD screen 1102 may help the user make sure that the measures being captured (photographed) are the measures that are intended to be heard. The LCD screen 1102, complete with a cursor 1136, displays the music passage 1104 as the passage is played back, either from a passage that was photographed by the user or from a music-card with stored data. The cursor indicates the exact music position in the score of the current note(s) being played as the music passage 1104 is played in real time, regardless of the specified tempo. Rather than a traditional type of moving cursor, the cursor 1136 can instead indicate the note being played by highlighting the note (e.g., making it brighter) or by giving it a different display color from the other notes as it is played. Another option is for the LCD screen 1102 to show the names of the notes (both in English and in solfege) 1138, particularly for a single-line music passage 1104. If the music passage 1104 is comprised of multiple simultaneous music lines, the user can specify the line for which the names of notes 1138 are displayed.

The LCD screen 1102 may also show an indicator of the music passage 1104 selected for play. The indicator is referred to as the passage marker 1139. In FIG. 11, the passage marker 1139 is shown as numeral "1" enclosed in a circle. The numerical "1" indicates the first measure of the music passage 1104 is currently being displayed, and the circle indicates that playback was initiated at the first measure. If playback continues to the next measure, a "2" would be displayed in place of the "1", but the "2" would not be circled.

In another embodiment, the device 1100 may provide recording sensor functionality. For example, the microphone 1112 may be configured so that the user can record him/herself playing (and/or singing) the music passage 1104 in question and immediately play back the recording to compare the user's performance with that of the device 1100 (that is, of a previously recorded or synthesized rendition). This feature may be helpful for students to make adjustments in notes, tuning, rhythm, and dynamics. As noted above, a user performance can be recorded via the microphone 1112 to provide the "music dictation" feature.

Some embodiments of the device 1100 provide wireless capabilities. For example, the device 1100 may be operable to permit wireless communications with networks and other wireless-enabled device, and to permit downloads of encoded music files with contextual information. The features described herein can be provided, for example, by eMuse software installed to a wireless platform, such as a PDA or smartphone, for portable music interaction. In addition, the device 1100 may use computing and memory (and playback audio) of a home PC and/or stereo system, or another component.

In another embodiment, a user's performance may be recorded by the device 1100 and the user's performance may be subjected to a music note interpretation processing to generate data from which is produced a display of the music notes corresponding to the user's recorded performance. In this way, the device can take "musical dictation" and can convert a live audio performance by the user into a visual display of the music score corresponding to the performance. Thus, the music interpretation features of the device can process both music score data received by optical or electronic network communication, and can process music score data produced by a user's live performance, captured by a microphone.

the software described herein can be used in a variety of platforms. In one embodiment, aspects of eMuse are embedded in a high-end cell phone in which the cell-phone camera photographs a specific passage in a music score. The captured image is then compressed and sent to a remote server, which performs OCR operations on the image data to interpret the image into corresponding music note information. The server then sends back both a midi file and a graphic file, enabling this version of eMuse to play the music that was photographed and display the notes on the LCD as they are played.

Figure 12:
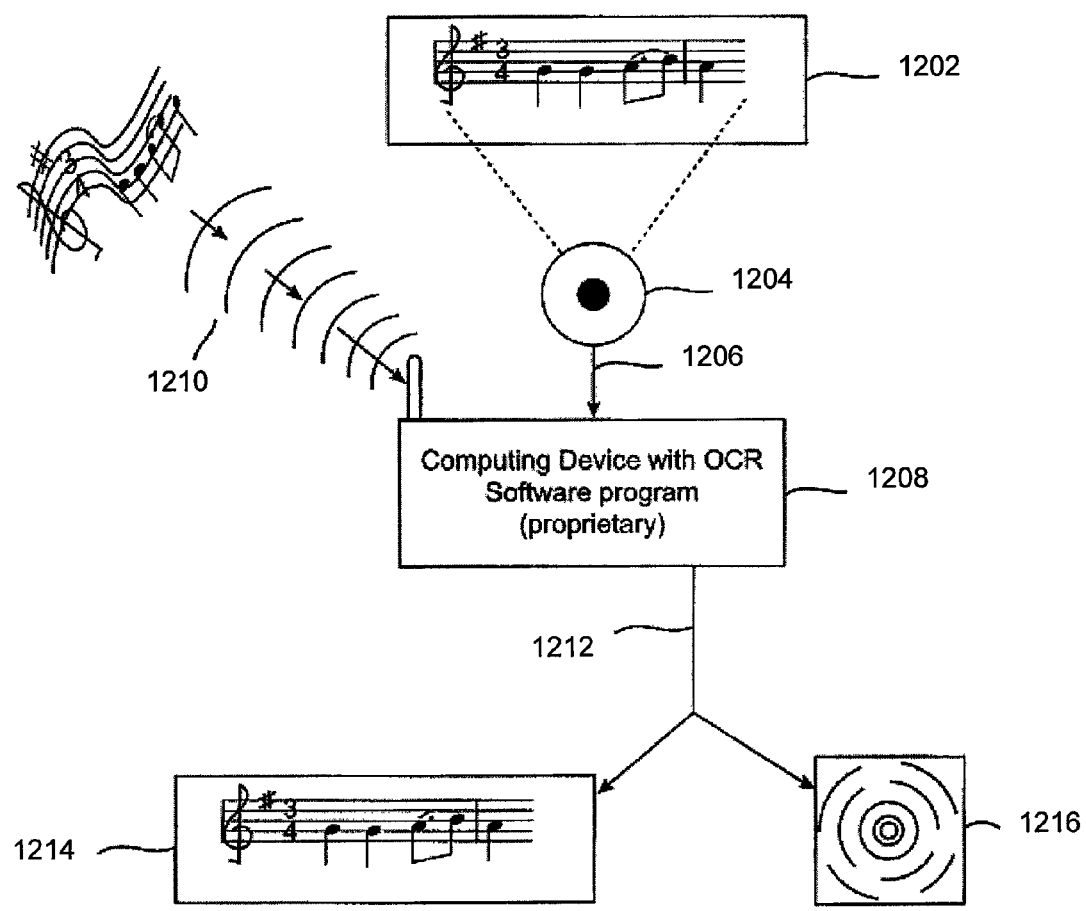
FIG. 12 provides a simplified process flow diagram that illustrates operation of an embodiment of a device similar to the one shown in FIG. 11.

FIG. 12 provides a simplified illustration of a process flow diagram that illustrates operation of an embodiment of the device 1100 in FIG. 11. In an initial operation, a digital representation of a music score is provided to the device. The digital representation can be received by a visual presentation 1202 to the device, such as a printed page, which is digitally captured using a digital image capture device 1204, such as a digital camera that operates with the device. The digital data derived from optical input 1206 is then provided to a note data interpretation process 1208. Alternatively, the digital representation of the music score can be provided electronically 1210, such as by wireless transmission of digital data corresponding to the music score or wired transmission of the data over a network, or input through a storage media such as a memory card or other media. The electronically received version of the music score 1210 is then provided to the note data interpretation process 1208.

The note data interpretation process 1208 receives the digital data corresponding to the music score and processes it to produce a set of music notes and concomitant information sufficient to specify the music score and enable its reproduction by suitable hardware. The process 1208 comprises a processor trained with machine learning techniques to recognize the music score digital data 1206, 1210 and produce appropriate transformed data. The process 1208 can be trained, for example, using neural network software engineering techniques to increase the accuracy of the interpretation process up to substantially 100% accuracy. In accordance with the present invention, the incoming music score data must be produced for audio and visual presentation to the user in real time, and therefore interpretation of the incoming music score data must be in real time and must approach 100% accuracy of interpretation (transformation). The process 1208 utilizes optical character recognition (OCR) techniques, but is adapted for music note recognition and interpretation of digital data (electronic or optical scan derived) to an appropriate representation.

The interpretation process output 1212 comprises a visual presentation of the music score, which is provided to a display screen 1214 of the device, and also a synthesized audio rendition of the music score, which is provided to appropriate device systems and hardware 1216 for audio presentation through loudspeakers of the device, or the like.

Other Capabilities

It will be appreciated that many other capabilities are possible in addition to those described above. One set of additional processing capabilities involves increasing the amount of customizability that is provided to a user. For example, embodiments may allow for enhanced customizability of various components and methods of the invention.

In some embodiments, the various thresholds, windows, and other inputs to the components and methods may each be adjustable for various reasons. For example, the user may be able to adjust the key extraction window, if it appears that key determinations are being made too often (e.g., the user may not want brief departures from the key to show up as a key change on the score). For another example, a recording may include a background noise coming from 60 Hz power used during the performance on the recording. The user may wish to adjust various filter algorithms to ignore this 60 Hz pitch, so as not to represent it as a low note on the score. In still another example, the user may adjust the resolution of music bins into which pitches are quantized to adjust note pitch resolution.

In other embodiments, less customizability may be provided to the user. In one embodiment, the user may be able to adjust a representational accuracy level. The user may input (e.g., via a physical or virtual slider, knob, switch, etc.) whether the system should generate more accurate or less accurate score representations, based on one or more parameter, including selecting the accuracy for individual score-representational elements, like tempo and pitch.

For example, a number of internal settings may work together so that the minimum note value is a sixteenth note. By adjusting the representational accuracy, longer or shorter durations may be detected and represented as the minimum value. This may be useful where a performer is not performing strictly to a constant beat (e.g., there is no percussion section, no metronome, etc.), and too sensitive a system may yield undesirable representations (e.g., triple-dotted notes). As another example, a number of internal settings may work together so that the minimum pitch change is a half-step (i.e., notes on the chromatic scale).

In still other embodiments, even less customizability may be provided to the user. In one embodiment, the user may input whether he or she is a novice user or an advanced user. In another embodiment, the user may input whether the system should have high or low sensitivity. In either embodiment, many different parameters in many components or methods may adjust together to fit the desired level. For example, in one case, a singer may wish to accurately transcribe every waver in pitch and duration (e.g., as a practice aid to find mistakes, or to faithfully reproduce a specific performance with all its aesthetic subtleties); while in another case, the singer may wish to generate an easy to read score for publication by having the system ignore small deviations.

In certain embodiments, the level of customizability, types of functionality, and other aspects of the systems or methods may be dictated in different ways. In one embodiment, the user may select certain preferences, manipulate certain physical or virtual controls, or otherwise actively interact with the system to determine those aspects. In another embodiment, the system may automatically select various aspects (e.g., from login and/or profile information relating to the user, from the user's pattern of use of the system, etc.).

Another set of additional capabilities involves using different types of input to refine or otherwise affect the processing of the input audio signal. One embodiment uses one or more trained artificial neural networks (ANN's) to refine certain determinations. For example, psycho-acoustical determinations (e.g., meter, key, instrumentation, etc.) may be well-suited to using trained ANN's.

Another embodiment provides the user with the ability to layer multiple tracks (e.g., a one-man band). The user may begin by performing a drum track, which is processed in real time using the system of the invention. The user may then serially perform a guitar track, a keyboard track, and a vocal track, each of which is processed. In some cases, the user may select multiple tracks to process together, while in other cases, the user may opt to have each track processed separately. The information from some tracks may then be used to refine or direct the processing of other tracks. For example, the drum track may be independently processed to generate high-confidence tempo and meter information. The tempo and meter information may then be used with the other tracks to more accurately determine note durations and note values. For another example, the guitar track may provide many pitches over small windows of time, which may make it easier to determine key. The key determination may then be used to assign key pitch determinations to the notes in the keyboard track. For yet another example, the multiple tracks may be aligned, quantized, or normalized in one or more dimension (e.g., the tracks may be normalized to have the same tempo, average volume, pitch range, pitch resolution, minimum note duration, etc.). Further, in some embodiments of the "one-man band", the user may use one instrument to generate the audio signal, then use the system or methods to convert to a different instrument or instruments (e.g., play all four tracks of a quartet using a keyboard, and use the system to convert the keyboard input into a string quartet). In some cases, this may involve adjusting the timbre, transposing the music lines, and other processing.

Still another embodiment uses inputs extrinsic to the music input signal to refine or direct the processing. In one embodiment, genre information is received either from a user, from another system (e.g., a computer system or the Internet), or from header information in the digital audio file to refine various cost functions. For example, key cost functions may be different for blues, Indian classical, folk, etc.; or different instrumentation may be more likely in different genres (e.g. an "organ-like" sound may be more likely an organ in hymnal music and more likely an accordion in Polka music).

Another set of additional capabilities involves using information across multiple components or methods to refine complex determinations. In one embodiment, the output of the instrument identification method is used to refine determinations based on known capabilities or limitations of the identified instruments. For example, say the instrument identification method determines that a music line is likely being played by a piano. However, the pitch identification method determines that the music line contains rapid, shallow vibrato (e.g., warbling of the pitch within only one or two semitones of the detected key pitch designation). Because this is not typically a possible effect to produce on a piano, the system may determine that the line is being played by another instrument (e.g., an electronic keyboard or an organ).

Yet another set of additional capabilities involves using the various functions of the systems and methods for handling ring tones (e.g., for cell phones, voice-over-internet-protocol phones, and other devices). In one embodiment, deconstructed music elements are manipulated to fit the specifications of a ring tone. For example, some devices may have limitations on the bandwidth for a ring tone, the depth of polyphony, and the length. Therefore, in some cases, the system may automatically adjust a collaboration project to fit the ring tone specifications, or may prompt a user with the information desired or required to guide the user according to those specifications. The user may then be able to, for example, listen to the ring tone, download the ring tone to a cell phone or other device (or a storage location), share the ring tone with others over the network, auction or sell the ring tone, etc.

Still another set of additional capabilities involves configuring audio or score output as a product for sale or auction. For example, a collaboration portal may include music auctioning functionality or music store functionality. The shopping functions may include capabilities relating to royalty and pricing, voting (e.g., featuring the most popular over a given time span, or the winner gets special featuring on the portal), search by device or specification, different payment processing, secure e-commerce, copyright protection and digital rights management, etc.

And another set of additional capabilities involves using deconstructed or received music elements to search for similar works to avoid (or detect) copyright infringement. This capability may require additional modules to be incorporated into the systems or additional steps to be incorporated into the methods to tailor a search for this particular result. For example, in some embodiments, information relating to copyright laws and policies may be provided to help the systems and methods determine if there is potential infringement.

Some embodiments of the collaboration portal may include this and other types of search functionality. For example, it may be desirable to provide a musical analog to "clip art" whereby a collaborator may search for particular type of musical theme (e.g., the "Hawaii Five-O" drum fill, etc.) to add to a project. Other types of information may also be searched. For example, a collaborator may wish to find a similar piece and look at a score representation to determine how the piece was orchestrated; or look at a similar chord sequence and find any jazz vocal improvisations which have interpreted similar chord sequences to help formulate an interesting vocal line. It will be appreciated that many ways of music-based searching are possible to provide this and other functionality. Some embodiments of music-based searching are described more fully in U.S. patent application Ser. No. 12/031,654 filed Feb. 14, 2008 entitled "MUSIC-BASED SEARCH ENGINE" to Robert D. Taub, et al., which is incorporated herein by reference for all purposes.

Even another set of additional capabilities involves adding music to video information. In some embodiments, the collaboration portal may allow users to provide video data. For example, a user may provide a video clip for use as inspiration for the collaboration project, as a music video to synchronize with the collaboration project, as a section of a larger video project (e.g., a movie) for which the collaborators are writing a score, etc. In another example, a user may provide certain time code information (e.g., Society of Motion Picture and Television Engineers ("SMPTE") time codes) for use by the collaborators in synchronizing the collaborative audio project with a video project.

It will be appreciated that many such additional processing capabilities are possible, according to the invention. Further, it should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Further, the headings provided herein are intended merely to aid in the clarity of the descriptions of various embodiments, and should not be construed as limiting the scope of the invention or the functionality of any part of the invention. For example, certain methods or components may be implemented as part of other methods or components, even though they are described under different headings.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

What is claimed is:

1. A method for processing music contributions over a network, the method comprising:
   receiving a music contribution at a portal, the music contribution comprising a set of music elements and the portal being accessible over the network; and
   generating music output at the portal relating to at least a portion of the music contribution and in response to at least one collaboration request received at the portal over the network;
   wherein the at least one collaboration request relates to the set of music elements; and
   wherein at least one music element of the set of music elements is generated by deconstructing at least a portion of the music contribution.

2. The method of claim 1, wherein deconstructing comprises:
   receiving the music contribution;
   determining music micro-elements of the music contribution;
   determining music macro-elements based on the determined music micro-elements.

3. The method of claim 1, wherein the set of music elements identify components of the music contribution at multiple time intervals within the music contribution.

4. The method of claim 3, wherein the components of the music contribution are identified relative to a recorded performance.

5. The method of claim 1, further comprising:
   receiving the music contribution at the portal, the music contribution comprising an audio signal; and
   deconstructing the audio signal to generate at least a portion of the set of music elements.

6. The method of claim 1, wherein the at least one music element generated from deconstruction comprises a music score representation.

7. The method of claim 1, wherein the music contribution is a first music contribution, and the method further comprises:
receiving a second music contribution at the portal, the second music contribution comprising an audio signal.

8. A system for processing music contributions over a network, the system comprising:
a portal, the portal being accessible over the network by a plurality of user workstations and comprising:
a collaboration unit, operable to:
receive a music contribution comprising a set of music elements; and
generate music output relating to at least a portion of the music contribution and in response to at least one collaboration request received at the portal over the network;
an editing unit, operable to provide a set of editing capabilities for editing music elements based at least in part on the collaboration request;
an output generation unit, operable to generate output data based at least in part on the music contribution and the collaboration request; and
a network interface unit, operable to facilitation communications via the network between the plurality of workstations and the portal;
wherein the at least one collaboration request relates to the set of music elements; and
wherein at least one music element of the set of music elements is generated by deconstructing at least a portion of the music contribution.

9. The system of claim 8, wherein deconstructing comprises:
receiving the music contribution;
determining music micro-elements of the music contribution;
determining music macro-elements based on the determined music micro-elements.

10. The system of claim 8, wherein the set of music elements identify components of the music contribution at multiple time intervals within the music contribution.

11. The system of claim 10, wherein the components of the music contribution are identified relative to a recorded performance.

12. The system of claim 8, further comprising:
an audio deconstruction unit, operable to:
receive a music contribution comprising an audio signal; and
deconstruct the audio signal and generate at least a portion of the set of music elements.

13. The system of claim 12, wherein the audio deconstruction unit is resident on at least one of the plurality of workstations.

14. The system of claim 8, further comprising:
a score deconstruction unit, operable to:
receive a score image; and
deconstruct the score image into a set of music elements.

15. The system of claim 14, wherein the score deconstruction unit is resident on at least one of the plurality of workstations.

16. The system of claim 8, wherein the at least one music element generated from deconstruction comprises a music score representation.

17. A computer-readable storage medium having a computer-readable program embodied therein for directing operation of a portal for processing of music contributions over a network including a collaboration unit, the collaboration unit including an editing unit, an output generation unit, and a network interface unit, the computer-readable program including computer executable instructions for collaborative handling of a music contribution in accordance with the following:
receiving a music contribution at a portal, the music contribution comprising a set of music elements and the portal being accessible over the network; and
generating music output at the portal relating to at least a portion of the music contribution and in response to at least one collaboration request received at the portal over the network;
wherein the at least one collaboration request relates to the set of music elements; and
wherein at least one music element of the set of music elements is generated by deconstructing at least a portion of the music contribution.

18. The computer-readable storage medium of claim 17, wherein deconstructing comprises:
receiving the music contribution;
determining music micro-elements of the music contribution;
determining music macro-elements based on the determined music micro-elements.

19. The computer-readable storage medium of claim 17, wherein the set of music elements identify components of the music contribution at multiple time intervals within the music contribution.

20. The computer-readable storage medium of claim 19, wherein the components of the music contribution are identified relative to a recorded performance.

21. The computer-readable storage medium of claim 17, further comprising:
receiving the music contribution at the portal, the music contribution comprising an audio signal; and
deconstructing the audio signal to generate at least a portion of the set of music elements.

22. The computer-readable storage medium of claim 17, wherein the at least one music element generated from deconstruction comprises a music score representation.

23. The computer-readable storage medium of claim 17, wherein the music contribution is a first music contribution, and the method further comprises:
receiving a second music contribution at the portal, the second music contribution comprising an audio signal.

24. A method for processing music contributions over a network, the method comprising:
receiving a music contribution at a portal, the music contribution comprising a set of music elements and the portal being accessible over the network;
receiving a plurality of collaboration requests at the portal over the network, each of the plurality of collaboration requests relating at least in part to the music contribution; and
generating music output at the portal relating to at least a portion of the music contribution and in response to at least one of the collaboration requests;
wherein at least one collaboration request relates to the set of music elements; and
wherein the set of music elements identify components of the music contribution relative to a recorded performance at multiple time intervals within the music contribution.

25. The method of claim 24, wherein at least one music element of the set of music elements is generated by deconstructing at least a portion of the music contribution.

26. The method of claim 24, further comprising:
receiving the music contribution at the portal, the music contribution comprising an audio signal; and
deconstructing the audio signal to generate at least a portion of the set of music elements.

27. The method of claim 24, wherein the music contribution is a first music contribution, and the method further comprises:
receiving a second music contribution at the portal, the second music contribution comprising an audio signal.

28. The method of claim 24, wherein at least a first portion of the plurality of collaboration requests is from a first user workstation, and at least a second portion of the plurality of collaboration requests is from a second user workstation.

29. A system for processing music contributions over a network, the system comprising:
a portal, the portal being accessible over the network by a plurality of user workstations, the portal comprising:
a collaboration unit, operable to:
receive a music contribution from a selected one of the plurality of user workstations, the music contribution comprising a set of music elements; and
receive a collaboration request that relates at least in part to the music contribution, wherein the set of music elements identify components of the music contribution relative to a recorded performance at multiple time intervals within the music contribution;
an editing unit, operable to provide a set of editing capabilities for editing music elements based at least in part on the collaboration request;
an output generation unit, operable to generate output data based at least in part on the music contribution and the collaboration request received at the portal; and
a network interface unit, operable to facilitation communications via the network between the workstation and the portal.

30. The system of claim 29, wherein at least one music element of the set of music elements is generated by deconstructing at least a portion of the music contribution.

31. The system of claim 29, further comprising:
an audio deconstruction unit, operable to:
receive a music contribution; and
deconstruct the music contribution into a set of music elements.

32. The system of claim 31, wherein the audio deconstruction unit is resident on at least one of the plurality of workstations.

33. The system of claim 29, a score deconstruction unit, operable to:
receive a score image; and
deconstruct the score image into a set of music elements.

34. The system of claim 33, wherein the score deconstruction unit is resident on at least one of the plurality of workstations.

35. The system of claim 29, wherein the music contribution is a first music contribution, and the collaboration unit is configured to receive a second music contribution that comprises an audio signal.

36. The system of claim 29, further comprising:
a score deconstruction unit, operable to:
receive a score image; and
deconstruct the score image into a set of music elements.

37. A computer-readable storage medium having a computer-readable program embodied therein for directing operation of a portal for processing music contributions over a network including a collaboration unit, the collaboration unit including an editing unit, an output generation unit, and a network interface unit, the computer-readable program including computer executable instructions for processing of a music contribution in accordance with the following:
receiving the music contribution at the portal, the music contribution comprising a set of music elements and the portal being accessible over the network;
receiving a collaboration request over the network from a user workstation, such that the collaboration request relates at least in part to the music contribution, wherein the set of music elements identify components of the music contribution relative to a recorded performance at multiple time intervals within the music contribution; and
generating music output at the portal relating to at least a portion of the music contribution and in response to the collaboration request;
wherein at least one collaboration request relates to the set of music elements; and
wherein the set of music elements define musical parameters of the music contribution relative to a recorded performance at multiple time intervals within the music contribution.

38. The computer-readable storage medium of claim 37, wherein at least one music element of the set of music elements is generated by deconstructing at least a portion of the music contribution.

39. The computer-readable storage medium of claim 37, further comprising:
receiving the music contribution at the portal, the music contribution comprising an audio signal; and
deconstructing the audio signal to generate at least a portion of the set of music elements.

40. The computer-readable storage medium of claim 37, wherein the music contribution is a first music contribution, and the method further comprises:
receiving a second music contribution at the portal, the second music contribution comprising an audio signal.

41. The computer-readable storage medium of claim 37, wherein at least a first portion of the plurality of collaboration requests is from a first user workstation, and at least a second portion of the plurality of collaboration requests is from a second user workstation.

* * * * *

UNITED STATES PATENT AND TRADEMARK OFFICE
CERTIFICATE OF CORRECTION

| | | |
|---|---|---|
| PATENT NO. | : 8,035,020 B2 | Page 1 of 1 |
| APPLICATION NO. | : 12/774661 | |
| DATED | : October 11, 2011 | |
| INVENTOR(S) | : Robert D. Taub et al. | |

It is certified that error appears in the above-identified patent and that said Letters Patent is hereby corrected as shown below:

Title Page, item (45), delete "Oct. 11, 2011" and insert -- * Oct. 11, 2011 --

In column 1, under section (*), delete "Subject to any disclaimer, the term of this patent is extended or adjusted under 35 U.S.C. 154(b) by 0 days." and insert -- Subject to any disclaimer, the term of this patent is extended or adjusted under 35 U.S.C. 154(b) by 0 days. This patent is subject to a terminal disclaimer. --

Signed and Sealed this
Twenty-ninth Day of November, 2011

David J. Kappos
*Director of the United States Patent and Trademark Office*